United States Patent
Pitigoi-Aron et al.

(10) Patent No.: US 10,402,365 B2
(45) Date of Patent: Sep. 3, 2019

(54) DATA LANE VALIDATION PROCEDURE FOR MULTILANE PROTOCOLS

(71) Applicant: QUALCOMM Incorporated, San Diego, CA (US)

(72) Inventors: Radu Pitigoi-Aron, San Jose, CA (US); Lalan Jee Mishra, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/201,369

(22) Filed: Nov. 27, 2018

(65) Prior Publication Data

US 2019/0220436 A1 Jul. 18, 2019

Related U.S. Application Data

(60) Provisional application No. 62/618,008, filed on Jan. 16, 2018.

(51) Int. Cl.
| | |
|---|---|
| *G06F 13/42* | (2006.01) |
| *G06F 13/364* | (2006.01) |
| *H04L 5/00* | (2006.01) |

(52) U.S. Cl.
CPC ...... *G06F 13/4291* (2013.01); *G06F 13/4282* (2013.01); *H04L 5/0044* (2013.01); *H04L 5/0046* (2013.01); *G06F 2213/0016* (2013.01)

(58) Field of Classification Search
None
See application file for complete search history.

(56) References Cited

U.S. PATENT DOCUMENTS

| | | | | |
|---|---|---|---|---|
| 6,961,388 B2 * | 11/2005 | Ling | .................... | H04B 7/0417 375/267 |
| 8,234,424 B2 * | 7/2012 | Liao | .................... | G06F 13/4295 370/389 |
| 8,464,145 B2 * | 6/2013 | Grivna | ................ | G06F 11/1016 714/801 |
| 9,208,121 B2 * | 12/2015 | Iyer | ........................ | G06F 13/42 |

(Continued)

OTHER PUBLICATIONS

'I2C-bus specification and user manual' UM10204 by NXP Semiconductors, 2014. (Year: 2014).*

(Continued)

*Primary Examiner* — Steven G Snyder
(74) *Attorney, Agent, or Firm* — Loza & Loza LLP

(57) ABSTRACT

Systems, methods, and apparatus are described that enable a serial bus to be operated in multiple modes that employ additional wires for communicating data such that the bus width may be dynamically extended to improve bandwidth and/or throughput. One method includes transmitting a set of frames or sequences of symbols configured to carry up to a maximum number of data bytes over the serial bus, transmitting control signaling over a first data lane and the clock lane after the set of frames or sequences of symbols has been transmitted, and transmitting a first signal over a second data lane while transmitting the control signaling that may indicate whether the set of frames or sequences of symbols includes padding. The first signal may indicate a number of valid bytes or words in the set of frames or sequences of symbols.

30 Claims, 25 Drawing Sheets

(56) References Cited

U.S. PATENT DOCUMENTS

| | | | |
|---|---|---|---|
| 9,319,114 B2* | 4/2016 | Ling | H04B 7/0417 |
| 9,355,058 B2* | 5/2016 | Iyer | G06F 13/42 |
| 9,749,159 B2* | 8/2017 | Whitby-Strevens | H04L 25/03866 |
| 9,800,642 B2* | 10/2017 | Yi | H04L 65/607 |
| 9,996,488 B2* | 6/2018 | Sengoku | G06F 13/364 |
| 10,007,628 B2* | 6/2018 | Pitigoi-Aron | G06F 13/364 |
| 10,073,808 B2* | 9/2018 | Wu | G06F 13/4273 |
| 10,139,875 B2* | 11/2018 | Sengoku | G06F 13/4291 |
| 10,146,733 B2* | 12/2018 | Iyer | G06F 13/42 |
| 10,153,873 B2* | 12/2018 | Seok | H04L 5/0026 |
| 10,241,955 B2* | 3/2019 | Pitigoi-Aron | G06F 13/4295 |
| 2003/0043928 A1* | 3/2003 | Ling | H04B 7/0417 375/267 |
| 2005/0276344 A1* | 12/2005 | Ling | H04B 7/0417 375/260 |
| 2008/0123638 A1* | 5/2008 | Liao | G06F 13/4295 370/389 |
| 2008/0162767 A1* | 7/2008 | Cho | G06F 13/4221 710/305 |
| 2009/0248978 A1 | 10/2009 | Solomon et al. | |
| 2011/0016374 A1* | 1/2011 | Grivna | G06F 13/4291 714/807 |
| 2014/0115207 A1* | 4/2014 | Iyer | G06F 13/42 710/105 |
| 2014/0126659 A1* | 5/2014 | Srinivasa | H04L 27/2602 375/260 |
| 2015/0067208 A1* | 3/2015 | Iyer | G06F 13/42 710/105 |
| 2015/0220472 A1 | 8/2015 | Sengoku | |
| 2015/0370735 A1* | 12/2015 | Pitigoi-Aron | G06F 13/364 710/110 |
| 2016/0056930 A1* | 2/2016 | Seok | H04L 5/0026 370/330 |
| 2016/0057657 A1* | 2/2016 | Seok | H04L 69/324 370/476 |
| 2016/0195910 A1* | 7/2016 | Sengoku | G06F 13/4291 710/313 |
| 2016/0364353 A1* | 12/2016 | Sengoku | G06F 13/364 |
| 2016/0378711 A1* | 12/2016 | Iyer | G06F 13/42 710/307 |
| 2017/0083475 A1* | 3/2017 | Wu | G06F 13/4273 |
| 2017/0255588 A1* | 9/2017 | Pitigoi-Aron | G06F 13/364 |
| 2018/0062887 A1* | 3/2018 | Sengoku | G06F 13/4291 |
| 2018/0300275 A1* | 10/2018 | Wu | G06F 13/4273 |
| 2019/0171609 A1* | 6/2019 | Mishra | G06F 13/4282 |

OTHER PUBLICATIONS

'Specification for I3C Basic' by MIPI Alliance, Inc, version 1.0, Jul. 19, 2018. (Year: 2018).*
International Search Report and Written Opinion—PCT/US2018/062903—ISA/EPO—dated Mar. 19, 2019.

* cited by examiner

DATA LANE VALIDATION PROCEDURE FOR MULTILANE PROTOCOLS

PRIORITY CLAIM

This application claims priority to and the benefit of U.S. Provisional Patent Application Ser. No. 62/618,008 filed in the U.S. Patent Office on Jan. 16, 2018, the entire content of this application being incorporated herein by reference as if fully set forth below in its entirety and for all applicable purposes.

TECHNICAL FIELD

The present disclosure relates generally to an interface between processing circuits and peripheral devices and, more particularly, to expanding data communication throughput on a serial bus.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol.

In one example, the Inter-Integrated Circuit serial bus, which may also be referred to as the I2C bus or the I$^2$C bus, is a serial single-ended computer bus that was intended for use in connecting low-speed peripherals to a processor. In some examples, a serial bus may employ a multi-master protocol in which one or more devices can serve as a master and a slave for different messages transmitted on the serial bus. Data can be serialized and transmitted over two bidirectional wires, which may carry a data signal, which may be carried on a Serial Data Line (SDA), and a clock signal, which may be carried on a Serial Clock Line (SCL).

In another example, the protocols used on an I3C bus derives certain implementation aspects from the I2C protocol. The I3C bus are defined by the Mobile Industry Processor Interface Alliance (MIPI). Original implementations of I2C supported data signaling rates of up to 100 kilobits per second (100 kbps) in standard-mode operation, with more recent standards supporting speeds of 400 kbps in fast-mode operation, and 1 megabit per second (Mbps) in fast-mode plus operation.

As applications have become more complex, demand for throughput over the serial bus can escalate and capacity continues to rise and there is a continuing demand for improved bus management techniques.

SUMMARY

Certain aspects of the disclosure relate to systems, apparatus, methods and techniques that support bus width expansion on a dynamic basis. Certain aspects relate to methods for improving flow control on a serial bus when multiple data lanes are used to increase bus capacity, including when some devices may not be configured to support multiple data lanes.

In various aspects of the disclosure, a method for managing data transmissions over a serial bus having multiple data lanes includes providing a plurality of frames to be transmitted over the serial bus, transmitting the plurality of frames over a corresponding number of data lanes of the serial bus in accordance with timing defined by a clock signal transmitted on a clock lane of the serial bus, transmitting control signaling over a first data lane and the clock lane after the first frame has been transmitted, and transmitting a first signal over a second data lane while transmitting the control signaling over the first data lane, the first signal indicating that a second frame transmitted over the second data lane includes padding. A first frame transmitted over the first data lane may include data that is part of a transaction executed between two devices coupled to the serial bus.

In one aspect, the control signaling includes a restart pattern or exit pattern when the serial bus is operated in accordance with a first protocol. The control signaling may include a repeated start condition or stop condition when the serial bus is operated in accordance with a second protocol.

In various aspects of the disclosure, an apparatus has a bus interface configured to couple the apparatus to a serial bus that provides multiple data lanes, and a controller. The controller may be configured to provide a plurality of frames to be transmitted over the serial bus, transmit the plurality of frames over a corresponding number of data lanes of the serial bus in accordance with timing defined by a clock signal transmitted on a clock lane of the serial bus, transmit a control signaling over a first data lane and the clock lane after the first frame has been transmitted, and transmit a first signal over a second data lane while transmitting the control signaling over the first data lane, the first signal indicating that a second frame transmitted over the second data lane includes padding. A first frame transmitted over the first data lane may include data that is part of a transaction executed between two devices coupled to the serial bus.

In various aspects of the disclosure, an apparatus includes means for providing a plurality of frames to be transmitted over a serial bus that provides multiple data lanes, means for transmitting the plurality of frames over a corresponding number of data lanes of the serial bus in accordance with timing defined by a clock signal transmitted on a clock lane of the serial bus, means for transmitting control signaling over a first data lane and the clock lane after the first frame has been transmitted, and means for transmitting a first signal over a second data lane while transmitting the r control signaling over the first data lane, the first signal indicating that a second frame transmitted over the second data lane includes padding. A first frame transmitted over the first data lane may include data that is part of a transaction executed between two devices coupled to the serial bus.

In various aspects of the disclosure, a computer-readable medium stores code, instructions and/or data, including code which, when executed by a processor, causes the processor to provide a plurality of frames to be transmitted over a serial bus that provides multiple data lanes, transmit the plurality of frames over a corresponding number of data lanes of the serial bus in accordance with timing defined by a clock signal transmitted on a clock lane of the serial bus, transmit control signaling over a first data lane and the clock lane after the first frame has been transmitted, and transmit a first signal over a second data lane while transmitting the control signaling over the first data lane, the first signal indicating that a second frame transmitted over the second data lane includes padding. A first frame transmitted over the first data lane may include data that is part of a transaction executed between two devices coupled to the serial bus.

In various aspects of the disclosure, a method for managing data transmissions over a serial bus having multiple data lanes includes encoding data in a sequence of symbols transmitted over the serial bus, transmitting the sequence of symbols over a plurality of lanes of the serial bus, transmitting control signaling over a first data lane and a clock lane of the serial bus after the sequence of symbols has been transmitted, and transmitting a first signal over a second data lane while transmitting the control signaling over the first data lane. The first signal may be encoded with information identifying a number of valid symbols in the sequence of symbols. Each bit of each symbol may determine signaling state of a data lane and clock information is embedded in transitions between consecutive symbols in the sequence of symbols. Each lane in the plurality of lanes may carry one bit of each symbol.

In various aspects of the disclosure, an apparatus includes a bus interface configured to couple the apparatus to a serial bus that provides multiple data lanes, and a controller. The controller may be configured to encode data in a sequence of symbols transmitted over the serial bus, transmit the sequence of symbols over a plurality of lanes of the serial bus, transmit control signaling over a first data lane and a clock lane of the serial bus after the sequence of symbols has been transmitted, and transmit a first signal over a second data lane while transmitting the control signaling over the first data lane. The first signal may be encoded with information identifying a number of valid symbols in the sequence of symbols. Each bit of each symbol may determine signaling state of a data lane and clock information is embedded in transitions between consecutive symbols in the sequence of symbols. Each lane in the plurality of lanes may carry one bit of each symbol.

DETAILED DESCRIPTION

Figure 1:
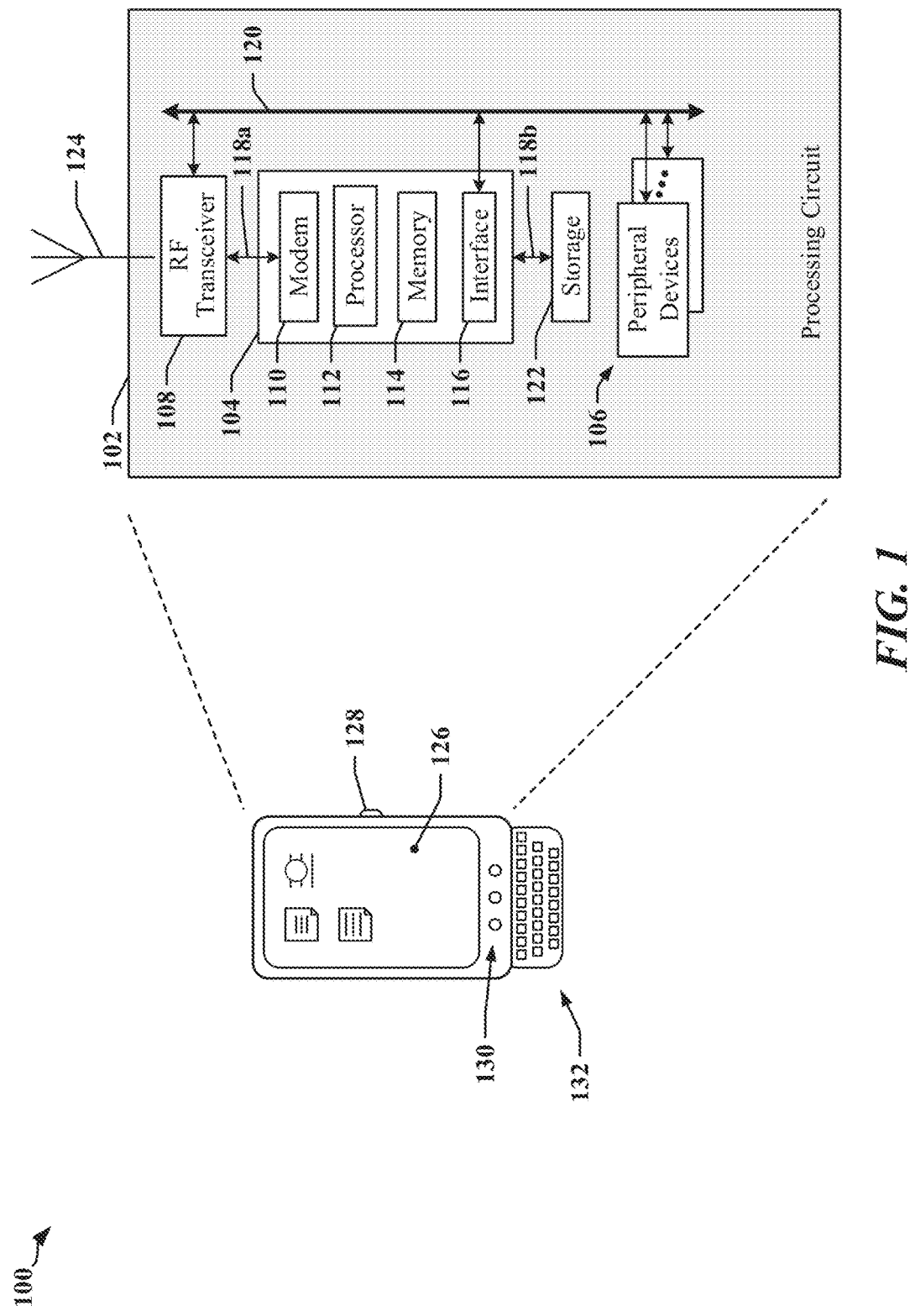
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a serial bus to connect application processor or other host device with modems and other peripherals. The serial bus may be operated in accordance with specifications and protocols defined by a standards body. The serial bus may be operated in accordance with a standard or protocol such as the I2C, I3C, serial low-power inter-chip media bus (SLIMbus), system management bus (SMB), radio frequency front-end (RFFE) protocols that define timing relationships between signals and transmissions. Certain aspects disclosed herein relate to systems, apparatus, methods and techniques that provide a mechanism that can be used on an I3C bus to dynamically extend the bus width to include secondary data lanes and thereby improve bandwidth and/or throughput. A transmitting device may send control information over secondary data lanes while transmitting a bus restart or exit pattern. The control information may indicate whether a transmission includes padding, or provides other indications.

In one example, a method performed at a transmitting device coupled to a serial bus includes providing one or more frames, each frame being configured to carry up to a maximum number of data bytes, transmitting a first frame over the serial bus, transmitting a restart or exit pattern over a first data lane and the clock lane after the first frame has been transmitted, and transmitting a first signal over a second data lane while transmitting the restart or exit pattern over the first data lane, the first signal indicating that a second frame transmitted over the second data lane includes padding. A first frame transmitted over the first data lane may include data that is part of a transaction executed between two devices coupled to the serial bus.

In another example, a method performed at a transmitting device coupled to a serial bus includes encoding data in a sequence of symbols transmitted over multiple lanes of a serial bus. Each symbol includes a bit that defines signaling state of a corresponding lane, and each pair of consecutively transmitted symbols have different values such that signaling state of at least one lane changes at each symbol boundary. A receive clock can be obtained based on detection of the transitions in signaling state between pairs of consecutively transmitted symbols. The transmitting device may transmit a restart or exit pattern over a first data lane and the clock lane, after the sequence of symbols has been transmitted. The transmitting device may transmit a first signal over at least one secondary data lane while transmitting the restart or exit pattern over the first data lane. The first signal may indicate whether the sequence of symbols includes padding.

Example of an Apparatus with a Serial Data Link

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device. FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
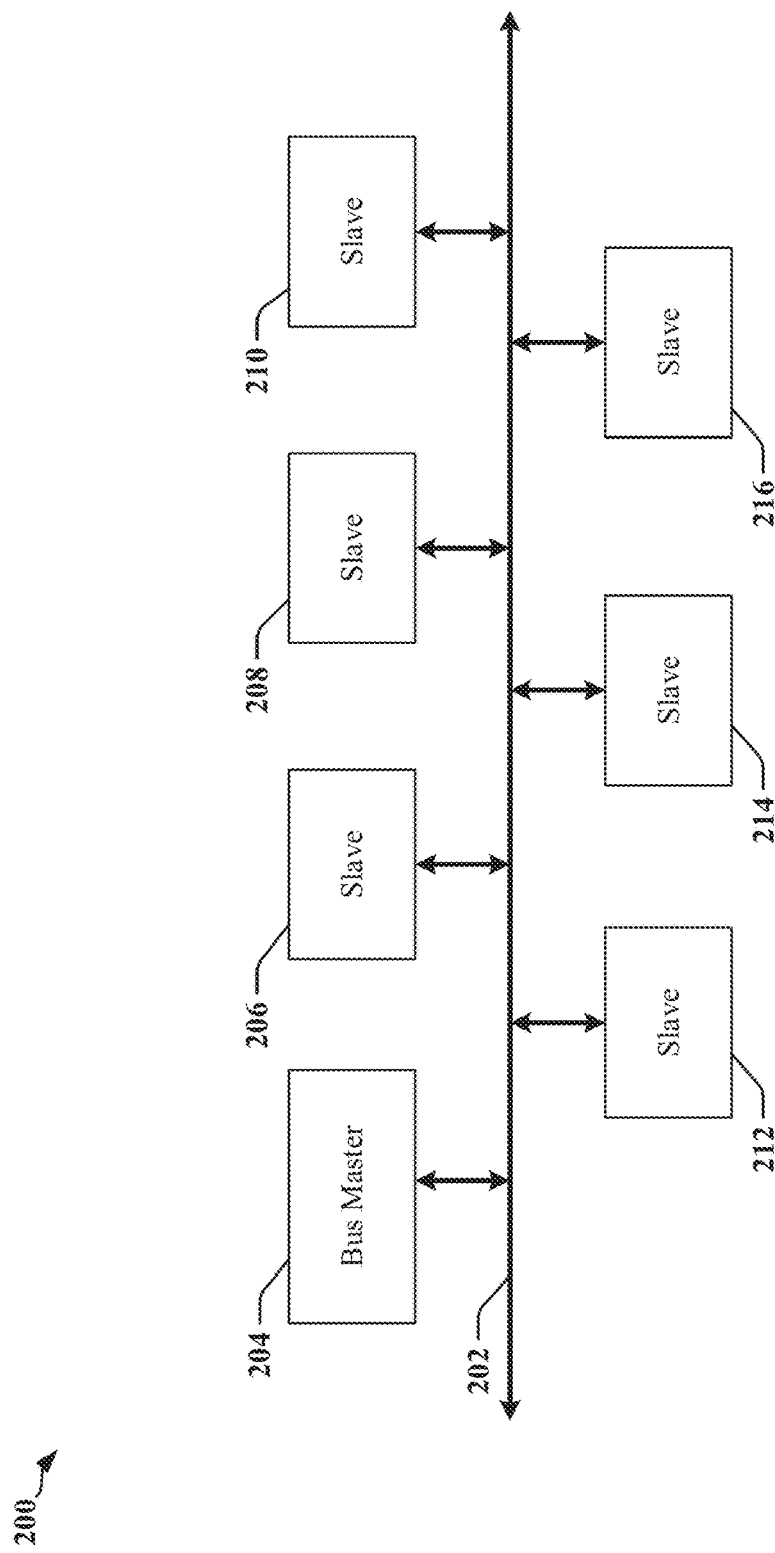
FIG. 2 illustrates a communication interface in which a plurality of devices is connected using a serial bus.

FIG. 2 illustrates a communication link 200 in which a configuration of devices 204, 206, 208, 210, 212, 214 and 216 are connected using a serial bus 202. In one example, the devices 204, 206, 208, 210, 212, 214 and 216 may be adapted or configured to communicate over the serial bus 202 in accordance with an I3C protocol. In some instances, one or more of the devices 204, 206, 208, 210, 212, 214 and 216 may alternatively or additionally communicate using other protocols, including an I2C protocol, for example.

Communication over the serial bus 202 may be controlled by a master device 204. In one mode of operation, the master device 204 may be configured to provide a clock signal that controls timing of a data signal. In another mode of operation, two or more of the devices 204, 206, 208, 210, 212, 214 and 216 may be configured to exchange data encoded in symbols, where timing information is embedded in the transmission of the symbols.

Figure 3:
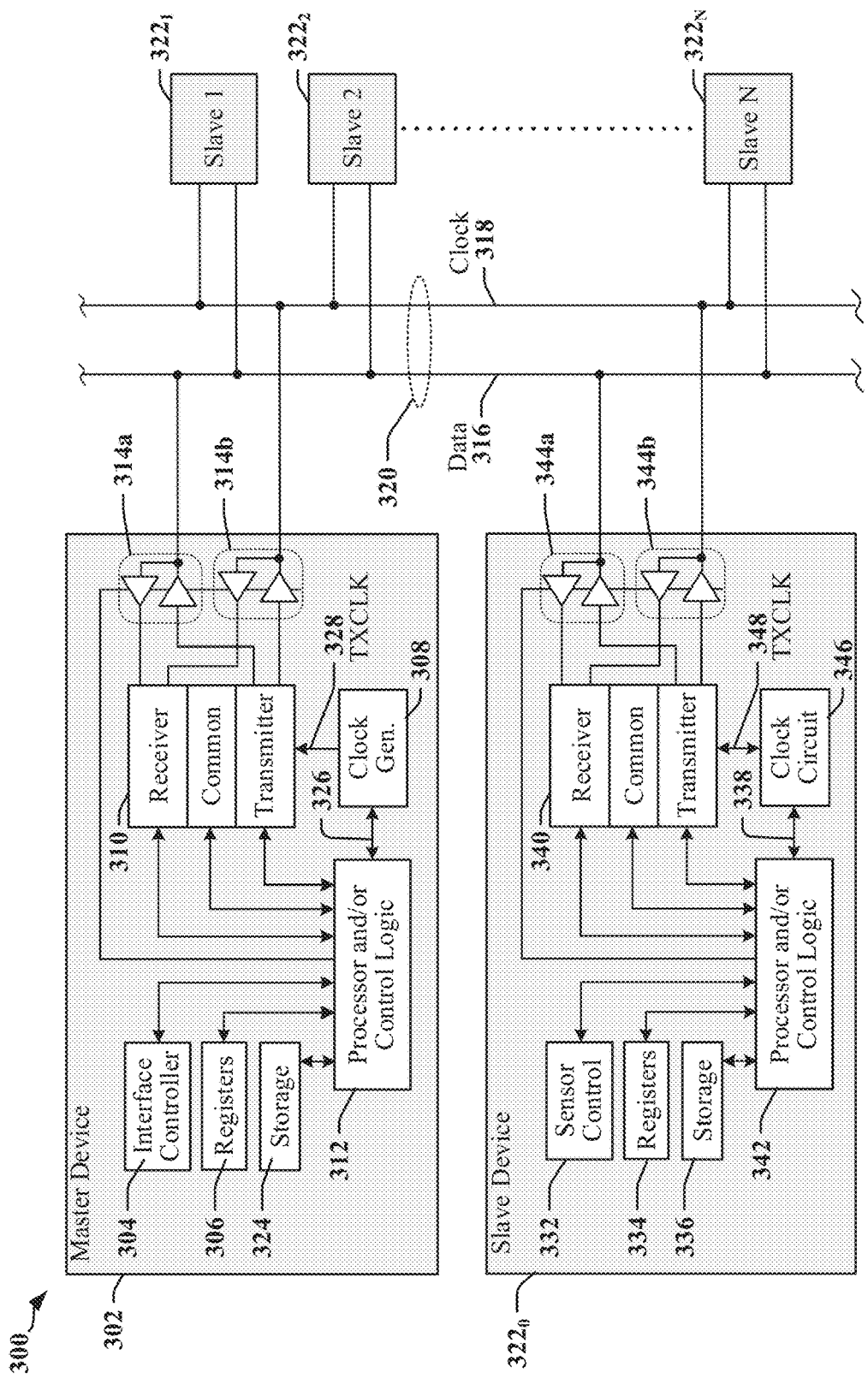
FIG. 3 illustrates certain aspects of an apparatus that includes multiple devices connected to a serial bus.

FIG. 3 illustrates certain aspects of an apparatus 300 that includes multiple devices 302, and $322_0$-$322_N$ coupled to a serial bus 320. The devices 302 and $322_0$-$322_N$ may be implemented in one or more semiconductor IC devices, such as an applications processor, SoC or ASIC. In various implementations the devices 302 and $322_0$-$322_N$ may include, support or operate as a modem, a signal processing device, a display driver, a camera, a user interface, a sensor, a sensor controller, a media player, a transceiver, and/or other such components or devices. In some examples, one or more of the slave devices $322_0$-$322_N$ may be used to control, manage or monitor a sensor device. Communications between devices 302 and $322_0$-$322_N$ over the serial bus 320 is controlled by a bus master 302. Certain types of bus can support multiple bus master devices 302.

In one example, a bus master device 302 may include an interface controller 304 that may manage access to the serial bus, configure dynamic addresses for slave devices $322_0$-$322_N$ and/or generate a clock signal 328 to be transmitted on a clock line 318 of the serial bus 320. The bus master device 302 may include configuration registers 306 or other storage 324, and other control logic 312 configured to handle protocols and/or higher-level functions. The control logic 312 may include a processing circuit such as a state machine, sequencer, signal processor or general-purpose processor. The bus master device 302 includes a transceiver 310 and line drivers/receivers 314a and 314b. The transceiver 310 may include receiver, transmitter and common circuits, where the common circuits may include timing, logic and storage circuits and/or devices. In one example, the transmitter encodes and transmits data based on timing in the clock signal 328 provided by a clock generation circuit 308. Other timing clocks 326 may be used by the control logic 312 and other functions, circuits or modules.

At least one device $322_0$-$322_N$ may be configured to operate as a slave device on the serial bus 320 and may include circuits and modules that support a display, an image sensor, and/or circuits and modules that control and communicate with one or more sensors that measure environmental conditions. In one example, a slave device $322_0$ configured to operate as a slave device may provide a control function, module or circuit 332 that includes circuits and modules to support a display, an image sensor, and/or circuits and modules that control and communicate with one or more sensors that measure environmental conditions. The slave device $322_0$ may include configuration registers 334 or other storage 336, control logic 342, a transceiver 340 and line drivers/receivers 344a and 344b. The control logic 342 may include a processing circuit such as a state machine, sequencer, signal processor or general-purpose processor. The transceiver 310 may include receiver, transmitter and common circuits, where the common circuits may include timing, logic and storage circuits and/or devices. In one example, the transmitter encodes and transmits data based on timing in a clock signal 348 provided by clock generation and/or recovery circuits 346. The clock signal 348 may be derived from a signal received from the clock line 318. Other timing clocks 338 may be used by the control logic 342 and other functions, circuits or modules.

The serial bus 320 may be operated in accordance with RFFE, I2C, I3C, SPMI, or other protocols. At least one device 302, $322_0$-$322_N$ may be configured to operate as a master device and a slave device on the serial bus 320. Two or more devices 302, $322_0$-$322_N$ may be configured to operate as a master device on the serial bus 320.

In some implementations, the serial bus 320 may be operated in accordance with an I3C protocol. Devices that communicate using the I3C protocol can coexist on the same serial bus 320 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 320, in addition to data formats and aspects of bus control. In some aspects, the I2C and I3C protocols may define direct current (DC) characteristics affecting certain signal levels associated with the serial bus 320, and/or alternating current (AC) characteristics affecting certain timing aspects of signals transmitted on the serial bus 320. In some examples, a 2-wire serial bus 320 transmits data on a data line 316 and a clock signal on the clock line 318. In some instances, data may be encoded in the signaling state, or transitions in signaling state of the data line 316 and the clock line 318.

Data Transfers Over an I3C Serial Bus

Figure 4:
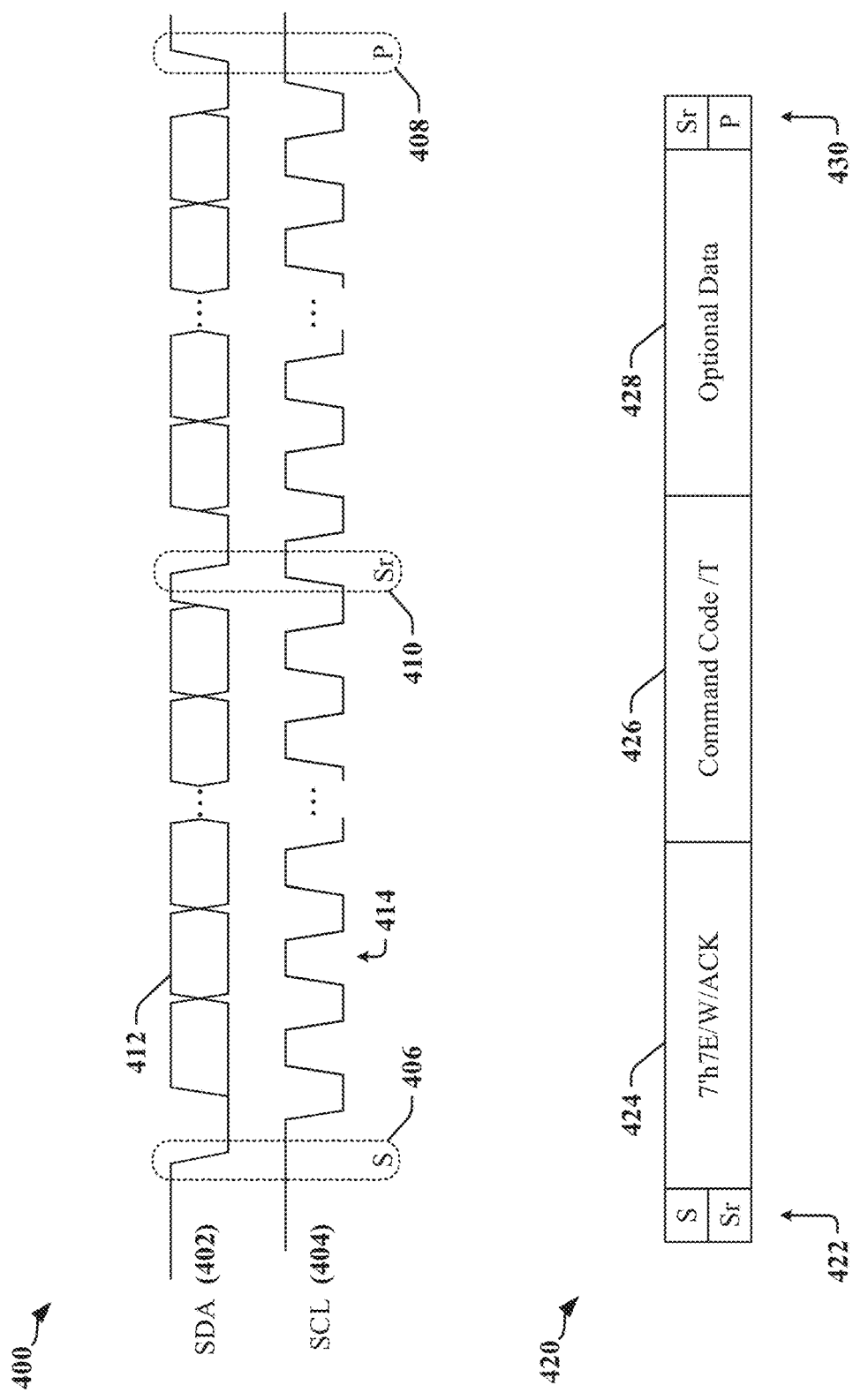
FIG. 4 includes a timing diagram that illustrates signaling on a serial bus when the serial bus is operated in a single data rate (SDR) mode of operation defined by I3C specifications.

FIG. 4 includes a timing diagram 400 that illustrates signaling on a serial bus when the serial bus is operated in a single data rate (SDR) mode of operation defined by I3C specifications. Data transmitted on a first wire (the Data wire 402) of the serial bus may be captured using a clock signal transmitted on a second wire (the Clock wire 404) of the serial bus. During data transmission, the signaling state 412 of the Data wire 4 is expected to remain constant for the duration of the pulses 414 when the Clock wire 404 is at a high voltage level. Transitions on the Data wire 402 when the Clock wire 404 is at the high voltage level indicate a START condition 406, a STOP condition 408 or a repeated START 410.

On an I3C serial bus, a START condition 406 is defined to permit the current bus master to signal that data is to be transmitted. The START condition 406 occurs when the Data wire 402 transitions from high to low while the Clock wire 404 is high. The bus master may signal completion and/or termination of a transmission using a STOP condition 408. The STOP condition 408 is indicated when the Data wire 402 transitions from low to high while the Clock wire 404 is high. A repeated START 410 may be transmitted by a bus master that wishes to initiate a second transmission upon completion of a first transmission. The repeated START 410 is transmitted instead of, and has the significance of a STOP condition 408 followed immediately by a START condition 406. The repeated START 410 occurs when the Data wire 402 transitions from high to low while the Clock wire 404 is high.

The bus master may transmit an initiator 422 that may be a START condition 406 or a repeated START 410 prior to transmitting an address of a slave, a command, and/or data. FIG. 4 illustrates a command code transmission 420 by the bus master. The initiator 422 may be followed in transmission by a predefined command 424 indicating that a command code 426 is to follow. The command code 426 may, for example, cause the serial bus to transition to a desired mode of operation. In some instances, data 428 may be transmitted. The command code transmission 420 may be followed by a terminator 430 that may be a STOP condition 408 or a repeated START 410.

Figure 5:
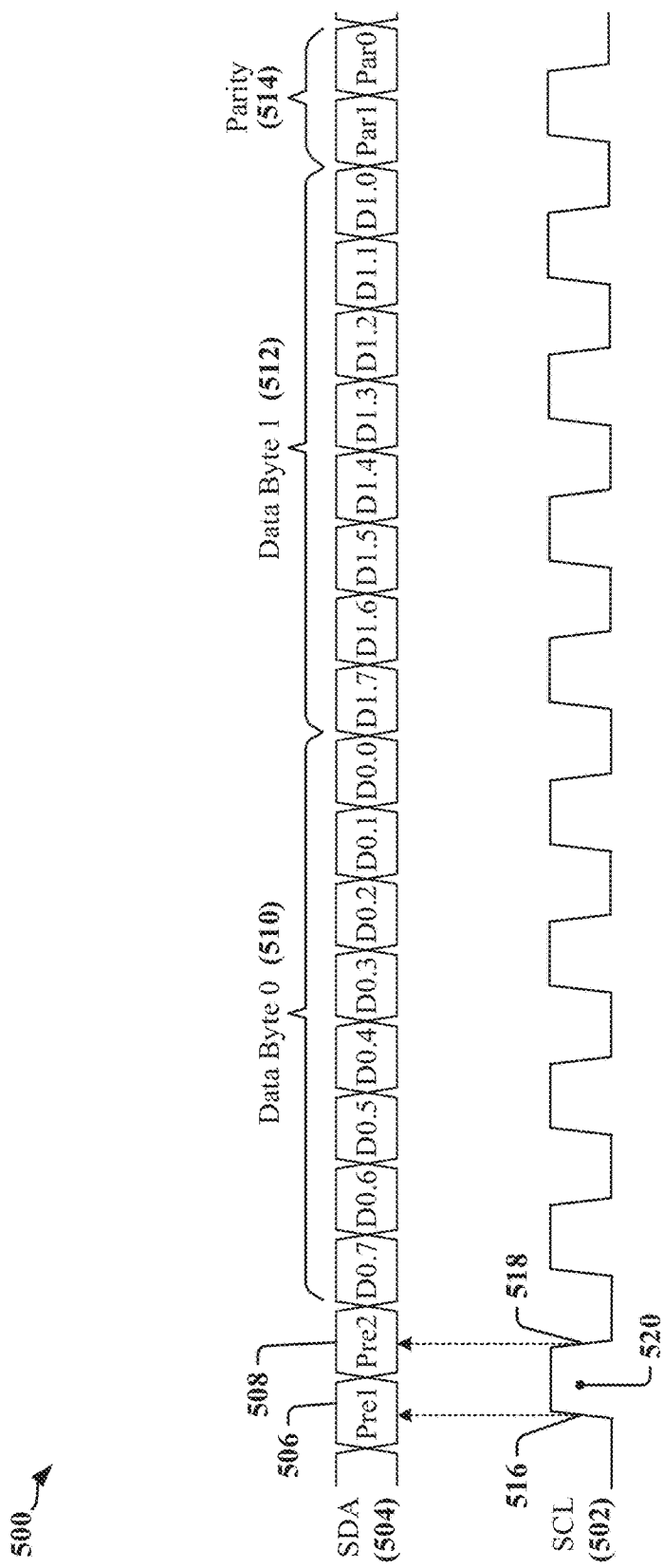
FIG. 5 is a timing diagram 500 that illustrates an example of a transmission in an I3C high data rate (HDR) mode, where data is transmitted at double data rate (DDR).

Certain serial bus interfaces support signaling schemes that provide higher data rates. In one example, I3C specifications define multiple high data rate (HDR) modes, including a high data rate, double data rate (HDR-DDR) mode in which data is transferred at both the rising edge and the falling edge of the clock signal. FIG. 5 is a timing diagram 500 that illustrates an example of a transmission in an I3C HDR-DDR mode, in which data transmitted on the Data wire 504 is synchronized to a clock signal transmitted on the Clock wire 502. The clock signal includes pulses 520 that are defined by a rising edge 516 and a falling edge. A master device transmits the clock signal on the Clock wire 502, regardless of the direction of flow of data over the serial bus. A transmitter outputs one bit of data at each edge 516, 518 of the clock signal. A receiver captures one bit of data based on the timing of each edge 516, 518 of the clock signal.

Certain other characteristics of an I3C HDR-DDR mode transmission are illustrated in the timing diagram 500 of FIG. 5. According to certain I3C specifications, data transferred in HDR-DDR mode is organized in words. A word generally includes 16 payload bits, organized as two 8-bit bytes 510, 512, preceded by two preamble bits 506, 508 and followed by two parity bits 514, for a total of 20 bits that are transferred on the edges of 10 clock pulses. The integrity of the transmission may be protected by the transmission of the parity bits 514.

Figure 6:
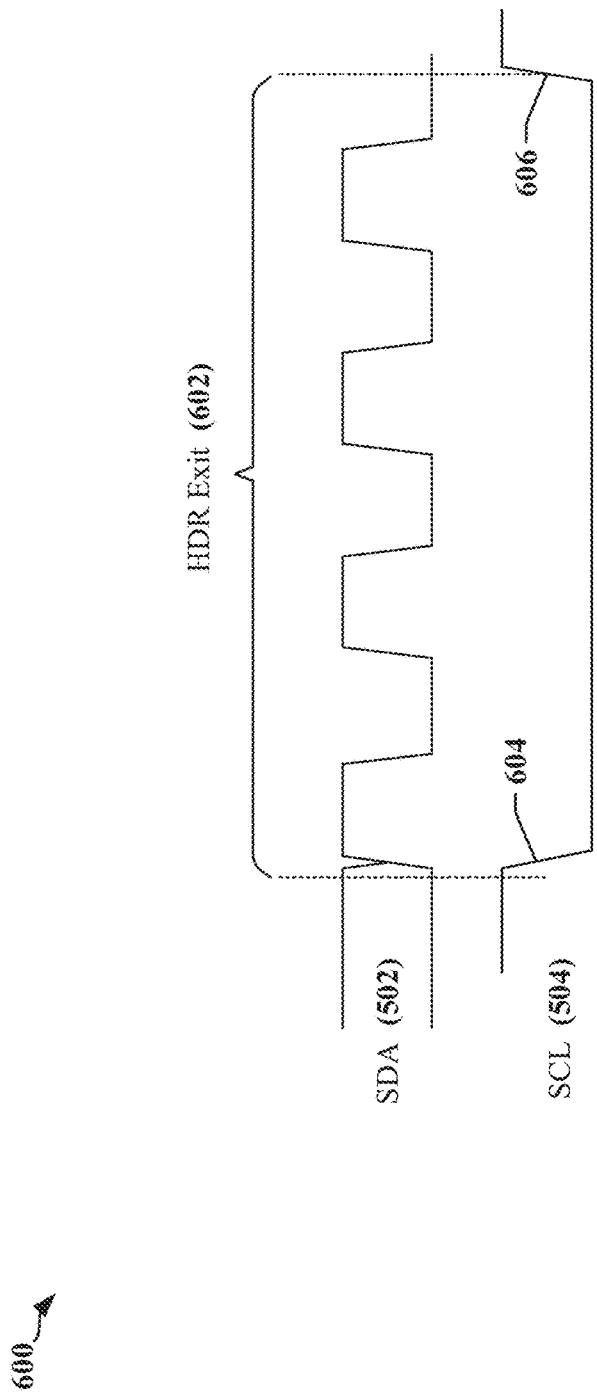
FIG. 6 illustrates an example of signaling transmitted on the Data wire and Clock wire of a serial bus to initiate certain mode changes.

FIG. 6 illustrates an example of signaling 600 transmitted on the Data wire 504 and Clock wire 502 to initiate certain mode changes. The signaling 600 is defined by I3C protocols for use in initiating restart, exit and/or break from I3C HDR modes of communication. The signaling 600 includes an HDR Exit 602 that may be used to cause an HDR break or exit. The HDR Exit 602 commences with a falling edge 604 on the Clock wire 502 and ends with a rising edge 606 on the Clock wire 502. While the Clock wire 502 is in low signaling state, four pulses are transmitted on the Data wire 504. I2C devices ignore the Data wire 504 when no pulses are provided on the Clock wire 502.

In another HDR mode, I3C specifications define a ternary encoding scheme in which transmission of a clock signal is suspended and data is encoded in symbols that define signals that are transmitted over the clock and data lines. Clock information is encoded by ensuring that a transition in signaling state occurs at each transition between two consecutive symbols.

Certain I3C implementations support HDR modes in which data is encoded in symbols that, when transmitted control the signaling state of multiple wires, including the clock wire. In these modes, which may be referred to as phase differential data transfer modes, embed clock information in the transitions between symbols by ensuring that the signaling state of at least one wire changes at each boundary between successive symbols. In one HDR mode, I3C specifications define a ternary encoding scheme in which transmission of a clock signal is suspended and data is encoded in symbols that define signals that are transmitted over the clock and a data line. Clock information is encoded by ensuring that a transition in signaling state occurs at each transition between two consecutive symbols. When three or more wires are available to carry symbols, data may be encoded using number systems other that ternary.

Figure 7:
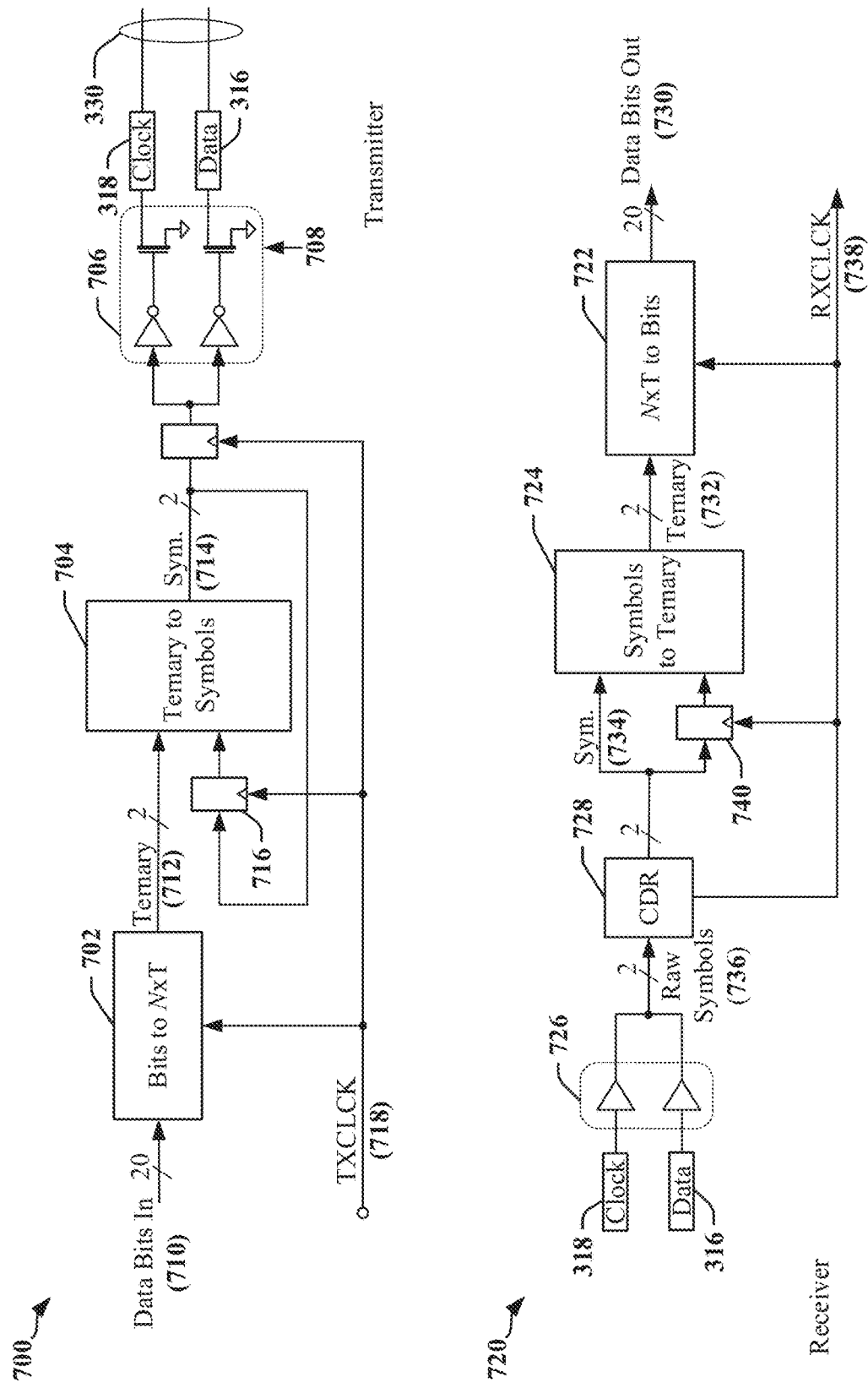
FIG. 7 illustrates certain aspects of a transmitter and a receiver configured for phase differential encoding in accordance with certain aspects disclosed herein.

FIG. 7 is a block diagram illustrating an example of a transmitter 700 and a receiver 720 configured according to certain aspects disclosed herein. The example relates to a two-wire serial bus 330 (see FIG. 3). For HDR ternary modes of operation, the transmitter 700 may transcode data 710 into ternary (base-3) numbers that are encoded as symbols transmitted on a pair of connectors, wires or line such as the Clock line 318 and Data line 316 signal wires. In the example depicted, each data element (also referred to as a data word) of the input data 710 may have a predefined number of bits, such as 8, 12, 16, 19 or 20 bits. A transcoder 702 may receive the input data 710 and produce a sequence of ternary numbers 712 for each data element. Each ternary number in the sequence of ternary numbers 712 may be encoded in two bits and there may be 12 ternary numbers in each sequence of ternary numbers 712. A ternary-to-symbols encoder 704 produces a stream of 2-bit symbols 714 that are transmitted through line drivers 706. In the example depicted, the line drivers 706 include open-drain output transistors 708. However, in other examples, the line drivers 706 may drive the Clock line 318 and Data line 316 signal wires using push-pull drivers. The output stream of 2-bit symbols 714 generated by the encoder has a transition in the state of at least one of the Clock line 318 and Data line 316 signal wires between consecutive symbols 714 by ensuring that no pair of consecutive symbols includes two identical symbols. The availability of a transition of state in at least one line 316 and/or 318 permits a receiver 720 to extract a receive clock 738 from the stream of data symbols 714.

In a high data rate interface, the receiver 720 may include or cooperate with a clock and data recovery (CDR) circuit 728. The receiver 720 may include line interface circuits 726 that provide a stream of raw 2-bit symbols 736 to the CDR circuit 728. The CDR circuit 728 extracts a receive clock 738 from the raw symbols 736 and provides a stream of 2-bit symbols 734 and the receive clock 738 to other circuits 724 and 722 of the receiver 720. In some examples, the CDR circuit 728 may produce multiple clocks 738. A symbols-to-ternary decoder 724 may use the receive clock 738 to decode the stream of symbols 734 into sequences of 12 ternary numbers 732. The ternary numbers 732 may be encoded using two bits. A transcoder 722 may then convert each sequence of 12 ternary numbers 732 into 8, 12, 16, 19 or 20-bit output data elements 730.

Figure 8:
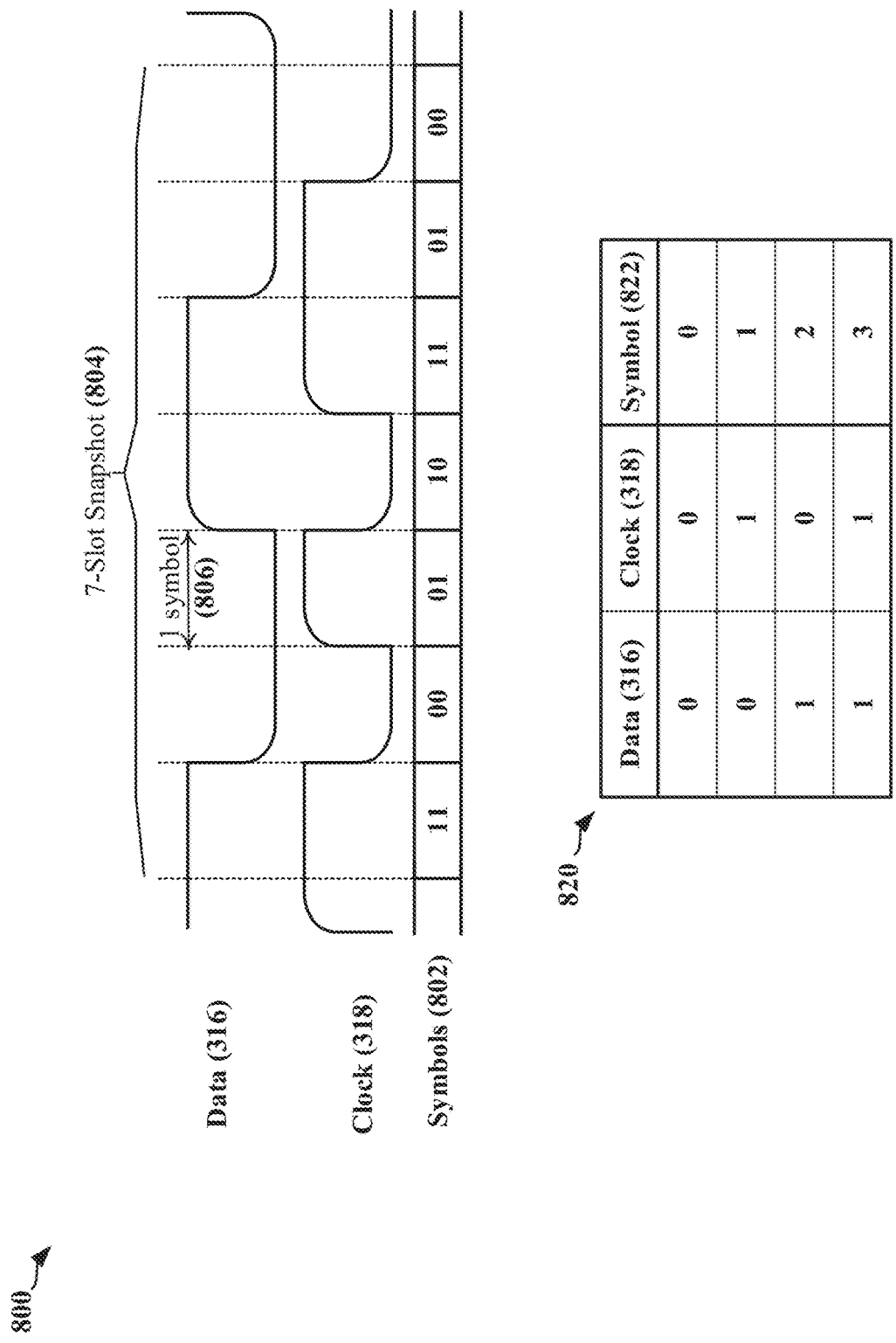
FIG. 8 illustrates the signaling state of a high data rate protocol, such as an I3C protocol, when transmitting symbols according to certain aspects disclosed herein.

FIG. 8 includes a timing diagram 800 illustrating the signaling state of the serial bus 330 when transmitting a sequence of symbols according to certain aspects disclosed herein. In the example depicted, both the Data line 316 and the Clock line 318 are used to encode data. Raw symbol values 802 cause line driving circuits to drive each of the Data line 316 and Clock line 318 to voltage levels determined by one bit of the current symbol value 802. In the example, a symbol bit that is set to "binary 1" causes a corresponding one of the Data line 316 and Clock line 318 to a more positive voltage level, while a symbol bit that is set to "binary 0" causes a corresponding one of the Data line 316 and Clock line 318 to a more negative voltage level.

FIG. 8 provides a table 820 showing the four possible signaling states for symbols 822 when each of the Data line 316 and Clock line 318 can be at one of two voltage levels. A data element having K bits may be encoded in a sequence of L symbols. The values of K and L may be determined based on encoding scheme, word size and configuration and other application parameters, including latency, etc. The timing diagram 800 illustrates an extract or snapshot of a symbol transmission sequence that includes 7 slots 804, where a symbol 806 may be transmitted in each of the slots 804. The 7 slots illustrated may be part of a larger symbol sequence such as a 12-symbol sequence that encodes a 16-bit word, or may include two or more sequences of symbols (e.g., 2, 3 . . . or 6 symbol examples, for example).

According to certain aspects disclosed herein, a transmitter 700 may be configured or adapted to ensure that the same symbol is not transmitted in any two consecutive slots in a sequence of slots 804. Accordingly, at least one of the Data line 316 and Clock line 318 changes signaling state at each boundary between consecutive symbols. The toggling of either of the Data line 316 and the Clock line 318 marks the beginning of a new symbol.

Figure 9:
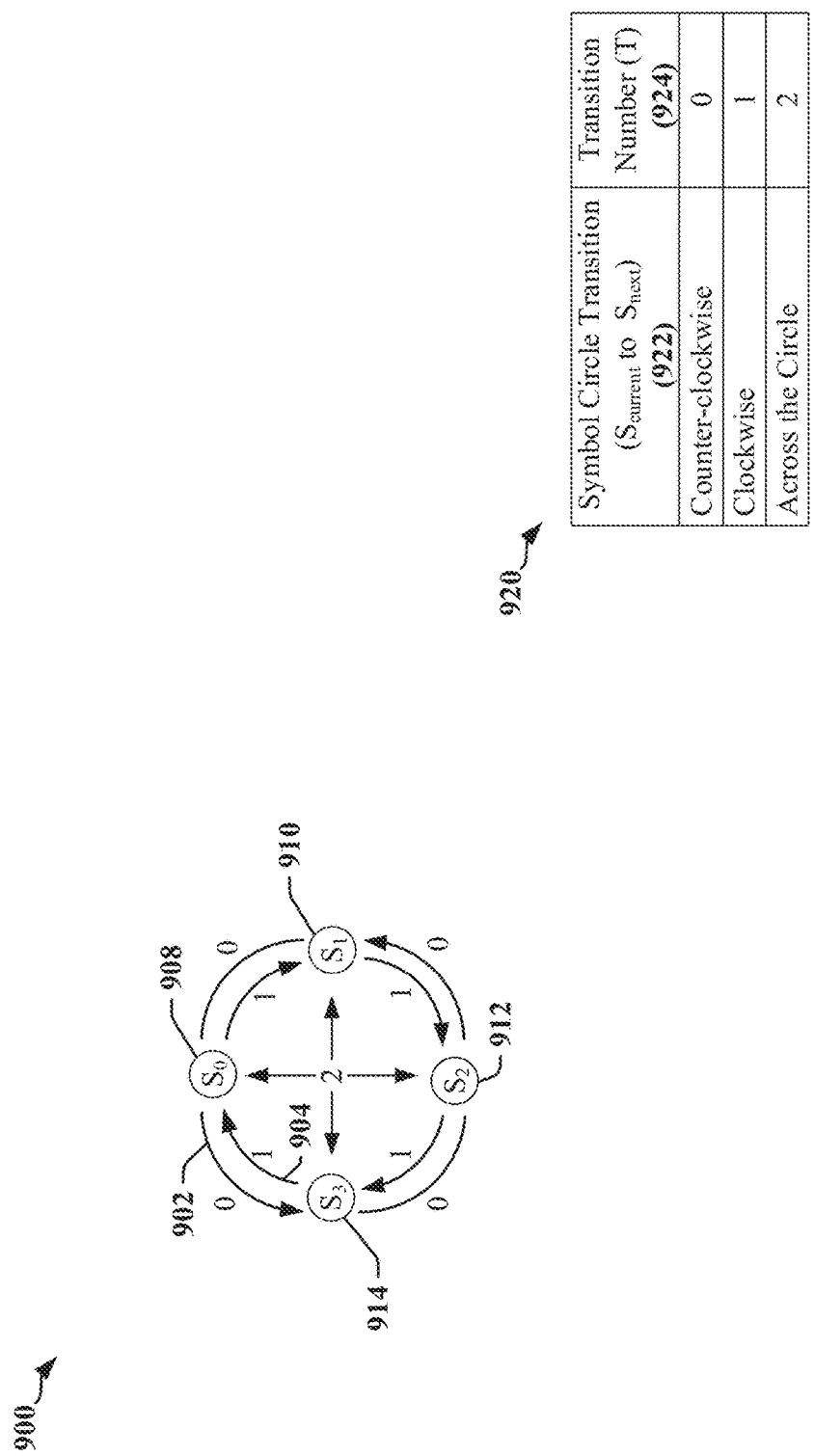
FIG. 9 illustrates an example of an encoding scheme for transcoding data according to certain aspects disclosed herein.

FIG. 9 illustrates an example of an encoding scheme employing symbol transition encoding on a two-wire serial bus 330. In this example, a variation of ternary-based number coding is employed in accordance with I3C HDR protocols. It is contemplated that certain concepts associated with symbol transitioning may be expanded to include a serial bus 330 that has three or more wires. Septenary-based number coding may be used when three wires are available for transmitting symbols, pentadecimal-based number coding may be used when four wires are available for transmitting symbols, and so on. In the two-wire example represented in the table 920 (see also FIGS. 7-9), the transition numbers 924 generated by an encoder (e.g. the transcoder 702 in the transmitter 700 of FIG. 7) may be represented as a displacement value 922 between states 908, 910, 912, 914 where the displacement value 922 represents a type of displacement including displacements on and across a circle 900. A clockwise displacement 904 may be represented as a ternary value T=1, a counter-clockwise displacement 902 may be represented as a ternary value T=0, and a displacement across the circle 900 (i.e., 2 steps clockwise or counterclockwise) may be represented as a ternary value T=2.

Other symbol encoding schemes may be implemented for two wire implementations and/or for implementations using more than two wires. In one example for N wires (W1 . . . WN), where N≥3, for three or more wires, encoding may be characterized by the transition number formula:

$$\{(W1_S \text{ XNOR } W1_{S-1}), (W2_S \text{ XNOR } W2_{S-1}), \ldots (WN_S \text{ XNOR } WN_{S-1})\}, \text{ for two consecutive states S and S-1.}$$

Multi-Lane Serial Bus

Various examples discussed herein may be based on, or refer to a MIPI-defined I3C bus, and to HDR-DDR and HDR Ternary modes. The use of MIPI I3C HDR-DDR mode and other I3C modes are referenced as examples only, and the principles disclosed herein are applicable in other contexts.

In some instances, enhanced capability and speed increases may be obtained by the addition of one or more supplementary lines, enabling a change in the coding base to higher numbers. For example, in addition to a two-wire bus, many I2C legacy systems use one or more dedicated interrupt lines between a master device and one or more slave devices. These dedicated interrupt lines may be repurposed (along with the two-wire bus) when the master device switches from a predefined base protocol (e.g., I2C) to a second protocol in which data symbols are encoded across the two-wire bus and one or more dedicated interrupt lines.

In one example, data may be encoded using transition encoding to obtain symbols for transmission over a two-line serial bus and one or more additional lines. When a single additional line is available, the second protocol can transmit 8 symbols over 3 wires (as compared to only 4 symbols over 2 wires), thus allowing for coding in base 7.

In another example, when a two-line I3C bus operated in SDR mode or HDR-DDR mode can be extended with one or more additional lines, data can be transmitted on the additional lines in accordance with the timing provided by a clock signal transmitted on the Clock line.

For the purpose of facilitating description, the term data lane may be used to refer to any data line or additional data line when more than two wires or lines are available for data transmission.

Figure 10:
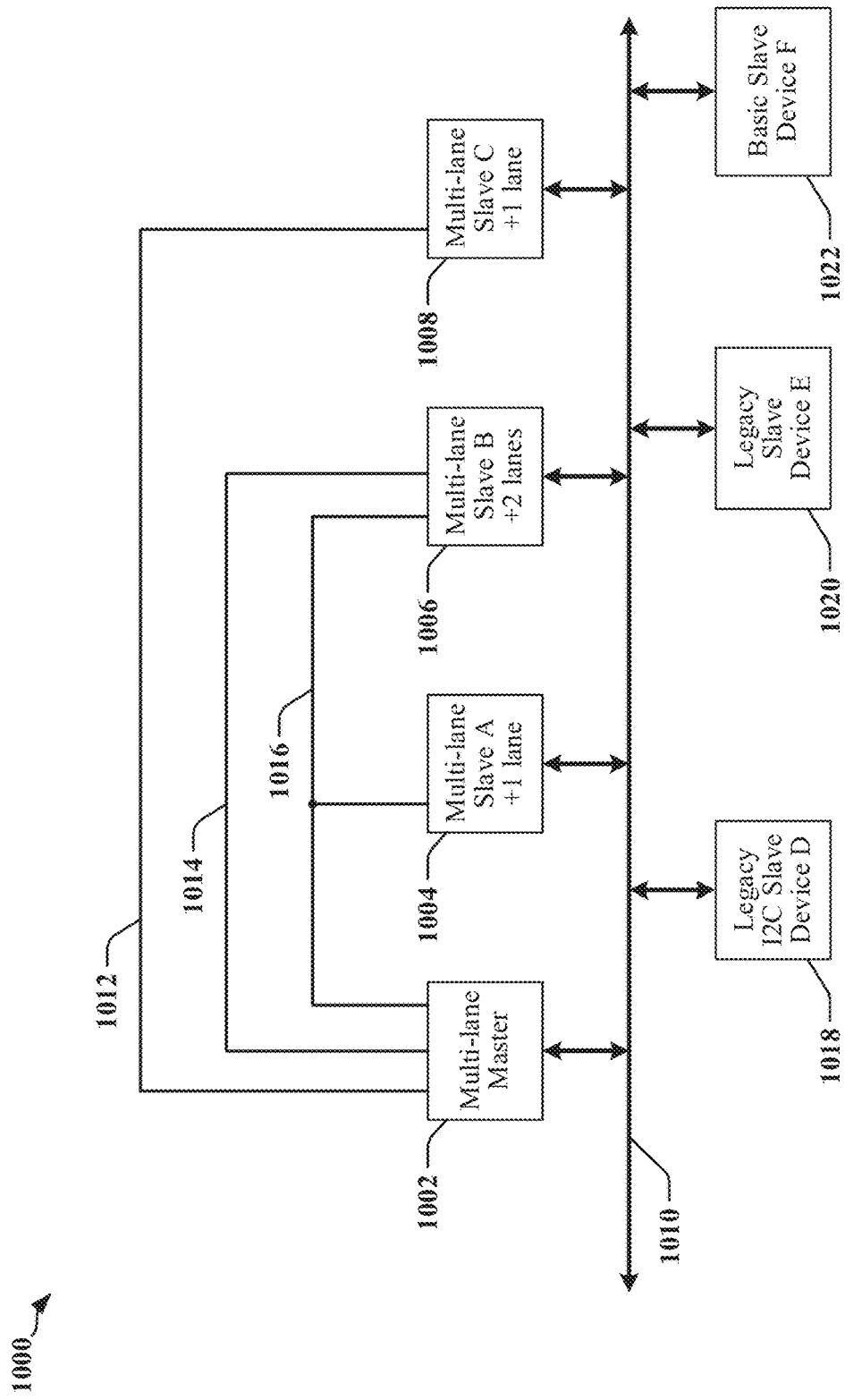
FIG. 10 illustrates a serial bus in which more than two connectors or wires may be available for timeshared communication between devices.

FIG. 10 illustrates a serial bus 1000 in which more than two connectors or wires may be available for timeshared communication between devices 1002, 1004, 1006, and/or 1008. Devices 1002, 1004, 1006, and/or 1008 that can support communication over an expanded serial bus that includes additional wires may be referred to as multi-wire devices or multi-lane devices. Note that the terms "connector", "wire", and "line" may be interchangeably used herein to refer to an electrically conductive path. In some instances, a "connector", "wire", and "line" may apply to an optically conductive path. In addition to the common lines 316, 318 of a 2-wire I3C bus, additional connectors or wires 1012, 1014, and/or 1016 may be employed to couple a multi-lane master device 1002 to one or more multi-lane slave devices 1004, 1006, and/or 1008 separately from the serial bus 1010. In one example, one Multi-lane slave device 1008 may be connected to the Multi-lane master device 1002 using a single, dedicated additional connector or wire 1012. In another example, one Multi-lane slave device 1004 may be connected to the Multi-lane master device 1002 using a single, shared additional connector or wire 1016. In another example, one Multi-lane slave device 1006 may be connected to the Multi-lane master device 1002 using two or more dedicated and/or shared additional connectors or wires 1014 and 1016. The number, type and arrangement of additional connectors or wires 1012, 1014, and/or 1016 can be selected to balance bandwidth and power consumption for communications between Multi-lane devices 1002, 1004, 1006, and/or 1008. In some instances, the additional connectors may include optical or other types of connectors.

According to certain aspects, any number of wires that is greater than two physical wires can be used in an I3C interface. Two of the wires may be common wires, such as the Clock line 318 and Data line 316 wires that are used for communicating with legacy devices 1018, 1020 and/or I3C devices 1022 that are not configured for multi-wire operation. Legacy devices 1018, 1020 may include I2C device 1018, an I3C device 1022, or another type of device that uses a two-wire protocol compatible with other devices 1002, 1004, 1006, 1008, 1018, 1020, 1022 coupled to the serial bus 1010.

Bus management messages may be included in shared bus management protocols implemented on the Multi-lane-capable bus client devices 1002, 1004, 1006, and 1008. Bus management messages may be transferred between Multi-lane-capable devices 1002, 1004, 1006, and 1008 using the two-wire serial bus 1010. Bus management messages may include address arbitration commands and/or messages, commands and/or messages related to data transport mode entry and exit, commands and/or messages used in the exchange of configuration data including, for example, messages identifying supported protocols, number and allocation of available physical wires, and commands and/or messages that are to negotiate or select a mode of communications.

As illustrated in FIG. 10, different legacy client devices 1018 and 1020 and I3C devices 1022 that have more basic signaling capabilities may be supported by the I3C interface. The devices 1002, 1004, 1006, 1008, 1018, 1020, 1022 coupled to the serial bus 1010 are compatible with at least one common mode of communication (e.g., predefined base protocol over the two-wire serial bus 1010). In one example the predefined base protocol (e.g., lowest common denominator protocol), may support an I2C mode of communication. In this latter example, each of the devices 1002, 1004, 1006, 1008, 1018, 1020, 1022 may be adapted to at least recognize start and stop conditions defined by the predefined base protocol.

Two or more devices 1002, 1004, 1006, 1008, 1020, and/or 1022 may communicate using a second protocol (e.g., I3C SDR, I3C HDR-DDR, I3C HDR-Ternary) that is not supported by some of the other devices coupled to the serial bus 1010. The two or more devices 1002, 1004, 1006, 1008, 1018, 1020, 1022 may identify capabilities of the other devices using the predefined base protocol (e.g., an I2C protocol), after an I3C exchange is initiated, and/or through signaling on one or more additional connectors or wires 1012, 1014 and/or 1016. In at least some instances, the configuration of devices coupled to the serial bus 1010 may be predefined in the devices 1002, 1004, 1006, 1008, 1018, 1020, 1022.

The additional connectors or wires 1012, 1014 and/or 1016 may include multipurpose, reconfigurable connectors, wires, or lines that connect two or more of the Multi-lane devices 1002, 1004, 1006, 1008. The additional connectors or wires 1012, 1014 and/or 1016 may include repurposed connections that may otherwise provide inter-processor communications capabilities including, for example interrupts, messaging and/or communications related to events. In some instances, the additional connectors or wires 1012, 1014 and/or 1016 may be provided by design. In one example, the predefined base protocol may utilize the additional connectors or wires 1012, 1014 and/or 1016 for sending interrupts from the slave devices to the master device. In the second protocol, the additional connectors or wires 1012, 1014 and/or 1016 may be repurposed to transmit data in combination with the two-wire bus.

Master and Slave roles are typically interchangeable between Multi-lane devices 1002, 1004, 1006, 1008, and FIG. 5 relates to a single interaction between two or more of the devices 1002, 1004, 1006, 1008, and/or 1022. As illustrated, the current master device 1002 can support extended communication capabilities with the other Multi-lane devices 1004, 1006, 1008, using a combination of the additional connectors or wires 1012, 1014, and 1016. The master Multi-lane device 1002 is connected to two slave devices 1004 and 1008 using a single additional connector or wire 1016 and 1012, respectively. The master Multi-lane device 1002 is connected to one slave device 1006 using a pair of additional wires 1014 and 1016. Accordingly, the master Multi-lane device 1002 may be configured to select a number of wires for communication based on the capabilities of all slave devices 1004, 1006, and/or 1008 that are involved in a transaction. For example, the Multi-lane master device 1002 may send data to the first Multi-lane slave device B 1006 using the two-wire serial bus 1010 plus both repurposed wires 1014 and 1016. Additionally, the Multi-lane master device 1002 may send data to the second Multi-lane slave device A 1004 using the two-wire serial bus 1010 plus a first repurposed wire 1016.

In a Multi-lane example involving I3C SDR or I3C HDR-DDR, data may be transmitted over two connectors, wires or lines 316, 318, 1012, 1014, and/or 1016 when one additional wire is available, and data may be transmitted over 4 connectors, lines or wires 316, 318, 1012, 1014, and/or 1016 when 3 additional wires are available, and so on.

Frame Structures for a Multi-Lane Serial Bus

Figure 11:
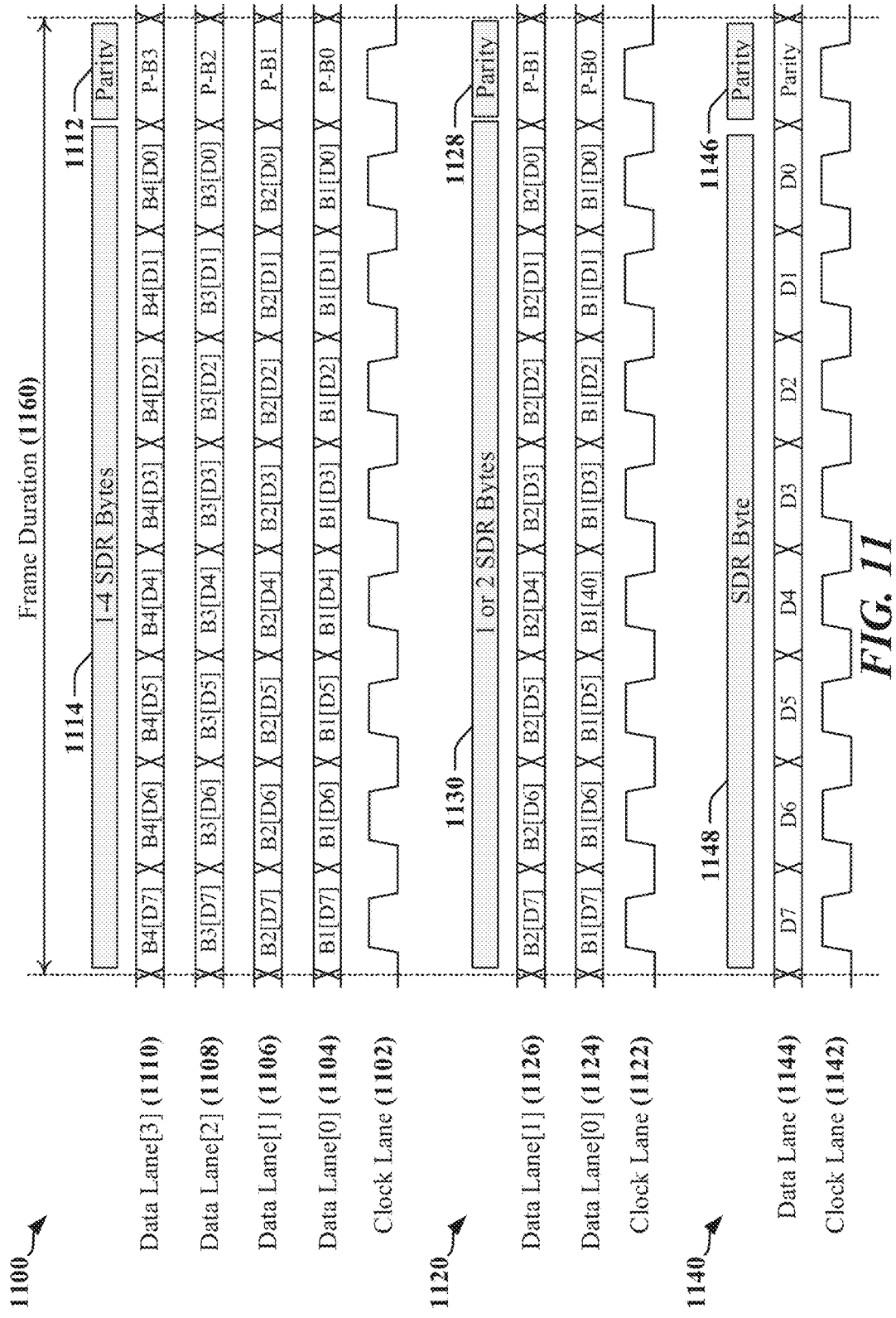
FIG. 11 illustrates first examples of data transmission data over an I3C serial bus operated in SDR mode when two or more devices can be coupled to additional connectors, lines or wires.

FIG. 11 relates to an SDR mode of operation in which data is clocked on an edge of each clock pulse in the clock signal. FIG. 11 illustrates examples 1100, 1120, 1140 of data transmission data over an I3C serial bus operated in the SDR mode when two or more devices can be coupled to additional connectors, lines or wires 1012, 1014, and/or 1016. In each example, 1100, 1120, 1140 a common transaction and/or frame duration 1160 is maintained regardless of the number of additional wires used. For example, a transaction that involves the use of 2 data wires and one clock wire can communicate twice as many bits as a transaction that uses 1 data wire and one clock signal. The additional bits include payload data bits, parity bits, other protocol bits, and/or other information. For example, parity bits 1112, 1128, 1146 are transmitted concurrently with a single clock pulse on each data wire. The parity bits 1112, 1128, 1146 are transmitted in the same time-slot (relative to the start of the transaction or frame) in each example 1100, 1120, 1140. The maintenance of a common transaction and/or frame duration 1160 can maintain a constant separation between breakpoints (e.g. T-bits), and devices coupled to the bus and configured for a conventional two-wire mode of operation remain unaware of the use of additional wires. The common transaction and/or frame duration 1160 may effectively define a cadence for bus operations.

In a first example 1140, no additional wires are used and communication proceeds using two wires (Clock and one Data wire). A serialized 8-bit data byte 1148 may be transmitted on a single data lane 1144 after a preamble bit and breakpoint, while a clock signal is transmitted on the clock lane 1142. A parity bit 1146 may be transmitted after the SDR data byte 1148. In a second example 1120, one additional wire is used and communication proceeds using three wires (Clock and two Data wires). Two 8-bit data bytes 1130 may be transmitted in parallel, after preamble bits and breakpoint. A parity bit 1128 may be transmitted on each data wire after the data bytes 1130, providing a total of two parity bits. In the example, data words may be transmitted in parallel on two data lanes 1124, 1126, while a clock signal is transmitted on the clock lane 1122. In another example 1100, three additional wires are used and communication proceeds using five wires (Clock and four Data wires). Four data bytes 1114 may be transmitted after preamble and breakpoint. In the example, the data bytes 1114 may be transmitted in parallel on the four data lanes 1104, 1106, 1108, 1110, while a clock signal is transmitted on the clock lane 1102. The preamble bits are typically transmitted on the primary data wire of the two-wire I3C bus, and signaling state of the additional connectors, lines or wires 1012, 1014, and/or 1016 may be ignored by a conventional receiver.

The examples 1100, 1120, 1140 illustrated in FIG. 11 provide a number of parity bits that can be used to provide enhanced error detection and correction capabilities. In one example, the parity bits transmitted on the data wire of the on the base 2-wire I3C are preserved and configured in accordance with I3C specifications. For example, a cyclic redundancy check for the preceding data bytes 1148, 1130, 1114 may be transmitted in the manner designated by the I3C Specifications.

As illustrated in certain of the examples, a multilane (ML) extension of an I3C bus may be implemented to provide increased data throughput, while keeping the I3C Interface bus management procedures. I3C frame settings are preserved to provide breakpoints at the expected time defined by the conventional I3C specifications. The ML version of the I3C interface permits devices of single, dual or quad data lanes to be connected on the same two-wire base lanes. ML-capable devices can be enabled a priori, with available data lanes enabled or supported.

In accordance with certain aspects disclosed herein, the arrangement of data transmitted in frames over a multi-lane serial bus may be configured based on protocol or application requirements. For example, bytes of data may be assigned to specific data lanes according to source, such that an individual line or group of lines may operate as defined channel. In another example, and as illustrated in FIG. 12, data bytes may be transmitted in a bit striping mode, whereby one or more data bytes are spread across all available lines of a multi-lane bus.

Figure 12:
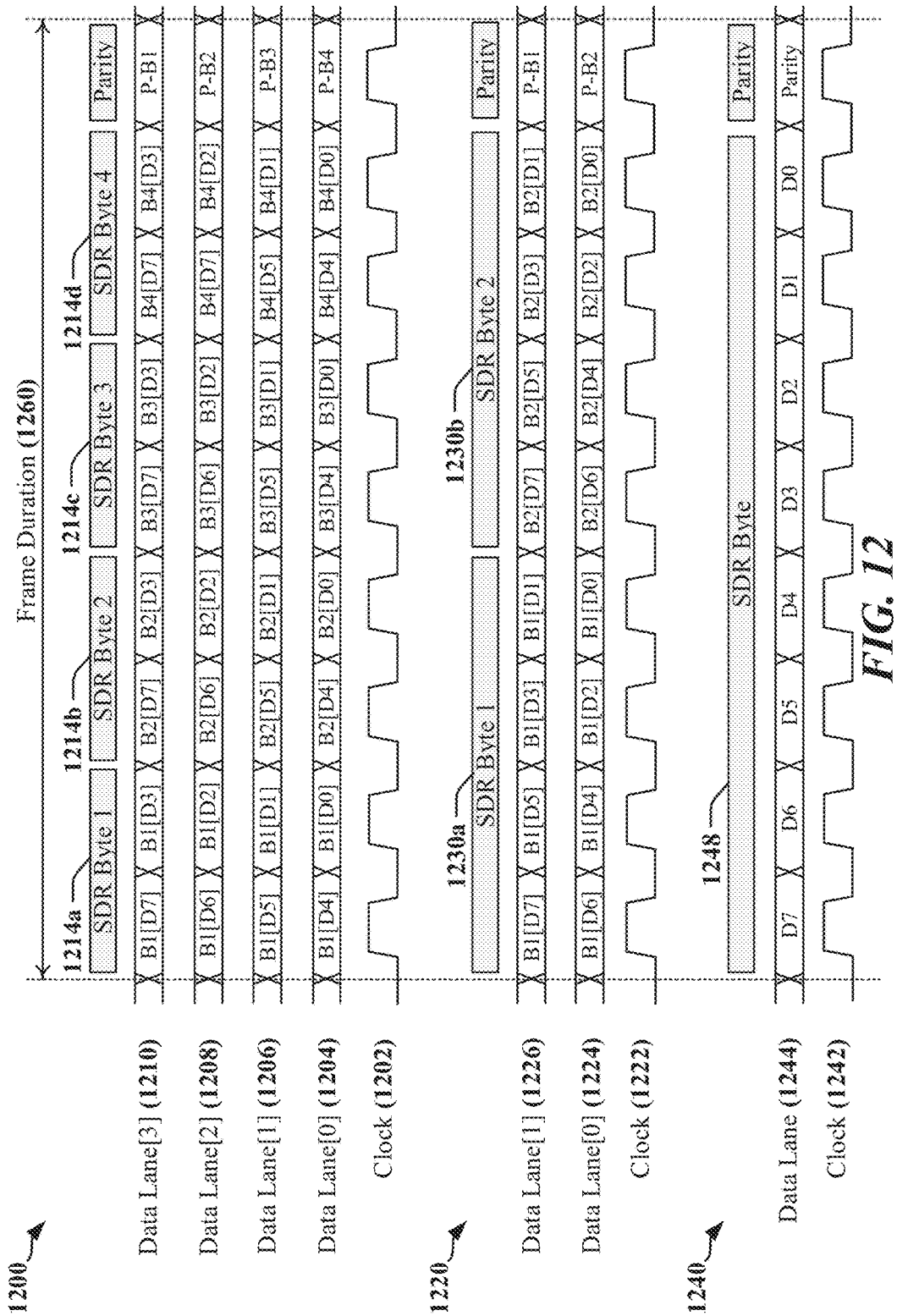
FIG. 12 illustrates second examples of data transmission data over an I3C serial bus operated in SDR mode when two or more devices can be coupled to additional connectors, lines or wires.

FIG. 12 illustrates datagram structures 1200, 1220 and 1240 in which bits in the multi-lane datagram structures 1200, 1220 of FIG. 12 are allocated in a different manner that the allocation of bits in the corresponding datagram structures illustrated in the examples 1100, 1120 and 1140 of FIG. 11. FIG. 12 illustrates data exchanges over an I3C serial bus operated in an SDR mode when two or more devices can be coupled to additional connectors, lines or wires. In each datagram structure 1200, 1220, 1240 a common transaction and/or frame duration 1260 is maintained regardless of the number of additional lines used. For example, a transaction that involves the use of 2 data lanes and one clock line can communicate twice as many bits as a transaction that uses 1 data lane and one clock signal. Additional bits may be transmitted, including payload data bits, parity bits, control bits, command bits, other protocol-defined bits and/or other information. In some implementations, devices coupled to the bus and configured for a conventional two-line mode of operation remain unaware of the use of additional lines. In some instances, a parity bit may be transmitted on each line concurrently with a single clock pulse. In some implementations, a common transaction and/or frame duration 1260 can be provided and breakpoints may be used to separate frames. The common transaction and/or frame duration 1260 may define a cadence for bus operations.

In the first datagram structure 1240, no additional lines are used and communication proceeds using two lines (configured as a clock lane 1242 and one data lane 1244). A serialized data byte 1248 may be terminated at a breakpoint defined by a T-bit or other breakpoint transmitted on the data lane 1244.

In a second datagram structure 1220, one additional line is used and communication proceeds using three lines (configured as a clock lane 1222 and two data lanes 1224, 1226). Two data bytes 1230*a*, 1230*b* may be terminated at a breakpoint (e.g., defined by a T-bit transmitted on one of the data lanes 1226, 1224. In the example, the data bytes 1230*a*, 1230*b* are transmitted in a striped mode, whereby a first data byte 1230*a* is completely transmitted in two-bit nibbles on the two data lanes before the second data byte 1230*b* is transmitted.

In another datagram structure 1200, three additional lines are used and communication proceeds using five lines (configured as a clock lane 1202 and four data lanes 1204, 1206, 1208, 1210). Four data bytes 1214*a*, 1214*b*, 1214*c* and 1214*d* may be terminated by a breakpoint and/or a T-bit transmitted on one of the data lanes 1204, 1206, 1208, 1210. In the example, the data bytes 1214*a*, 1214*b*, 1214*c*, 1214*d* are transmitted in a striped mode, whereby a first data byte 1214*a* is completely transmitted in four-bit nibbles on the four data lanes before the second data byte 1214*b* is transmitted. In other implementations, data bytes may be transmitted in parallel on the four data lanes. In each of the datagram structures 1200, 1220, 1240 in FIG. 12, data is clocked on one edge of each clock pulse in the clock signal transmitted on the clock lane 1202, 1222, 1242, in accordance with I3C SDR protocols.

Figure 13:
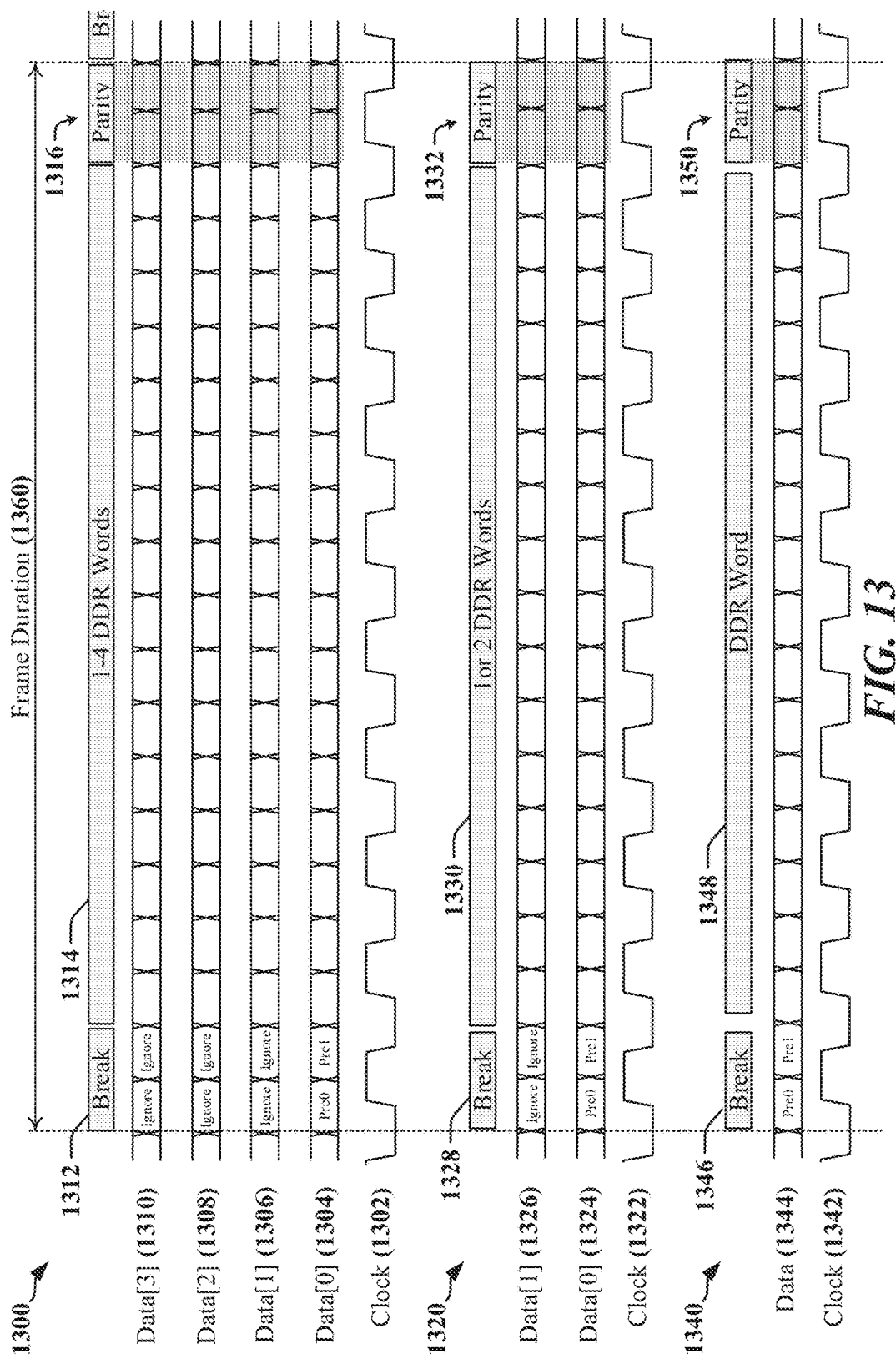
FIG. 13 illustrates first examples of data transmission data over an I3C serial bus operated in HDR-DDR mode when two or more devices can be coupled to additional connectors, lines or wires.

FIG. 13 illustrates an HDR-DDR mode of operation in which data may be clocked on both edges of each clock pulse in the clock signal. FIG. 13 illustrates examples 1300, 1320, 1340 of data transmission data over an I3C serial bus operated in HDR_DDR mode when two or more devices can be coupled to additional connectors, lines or wires 1012, 1014, and/or 1016. In each example, 1300, 1320, 1340 a common transaction and/or frame duration 1360 is maintained regardless of the number of additional wires used. For example, a transaction that involves the use of 2 data wires and one clock wire can communicate twice as many bits as a transaction that uses 1 data wire and one clock signal. The additional bits include payload data bits, parity bits, other protocol bits, and/or other information. For example, parity bits 1316, 1332, 1350 are transmitted concurrently with the edges of a single clock pulse on each data wire. The parity bits 1316, 1332, 1350 are transmitted in the same time-slot (relative to the start of the transaction or frame) in each example 1300, 1320, 1340. The maintenance of a common transaction and/or frame duration 1360 can maintain a constant separation between breakpoints (e.g. T-bits), and devices coupled to the bus that are configured for a conventional two-wire mode of operation remain unaware of the use of additional wires. The common transaction and/or frame duration 1360 may effectively define a cadence for bus operations.

In the first example 1340, no additional wires are used and communication proceeds using two wires (Clock and one Data wire). A serialized 16-bit data word 1348 may be transmitted on a single data lane 1344 after two preamble bits and breakpoint 1346, and while a clock signal is transmitted on the clock lane 1342. Two parity bits 1350 may be transmitted after the data word 1348. In a second example 1320, one additional wire is used and communication proceeds using three wires (Clock and two Data wires). Two 16-bit data words 1330 may be transmitted over two data lanes 1324, 1326 after the preamble bits and breakpoint 1328, and while a clock signal is transmitted on the clock lane 1322. Parity bits 1350 may be transmitted on each data wire after the data words 1330 providing a total of four parity bits. In the example, the data words 1330 are transmitted in parallel, whereby a data word is independently transmitted on each of the two data lanes 1324, 1326. In another example 1300, three additional wires are used and communication proceeds using five wires (Clock and four Data wires). Four data words 1314 may be transmitted on four data lanes 1304, 1306, 1308, 1310 after the preamble bits and breakpoint 1312, and while a clock signal is transmitted on the clock lane 1302. In the example, the data words 1314 are transmitted in parallel on the four data lanes 1304, 1306, 1308, 1310. The preamble bits are typically transmitted on the primary data wire of the two-wire I3C bus, and signaling state of the additional connectors, lines or wires 1012, 1014, and/or 1016 may be ignored by a conventional receiver.

The examples 1300, 1320, 1340 illustrated in FIG. 13 provide a number of parity bits that can be used to provide enhanced error detection and correction capabilities. In one example, the parity bits transmitted on the data wire of the on the base 2-wire I3C are preserved and configured in accordance with I3C specifications. For example, a 2-bit cyclic redundancy check for the preceding data words 1348, 1330, 1314 may be transmitted in a two-bit field.

As illustrated in certain of the examples, a ML extensions of an I3C bus may be implemented to provide increased data throughput, while keeping the I3C Interface bus management procedures. I3C frame settings are preserved to provide breakpoints at times defined by conventional I3C specifications. The ML version of the I3C interface permits devices of single, dual or quad data lanes to be connected on the same two-wire base lanes. ML-capable devices can be enabled a priori, with available data lanes enabled or supported.

Figure 14:
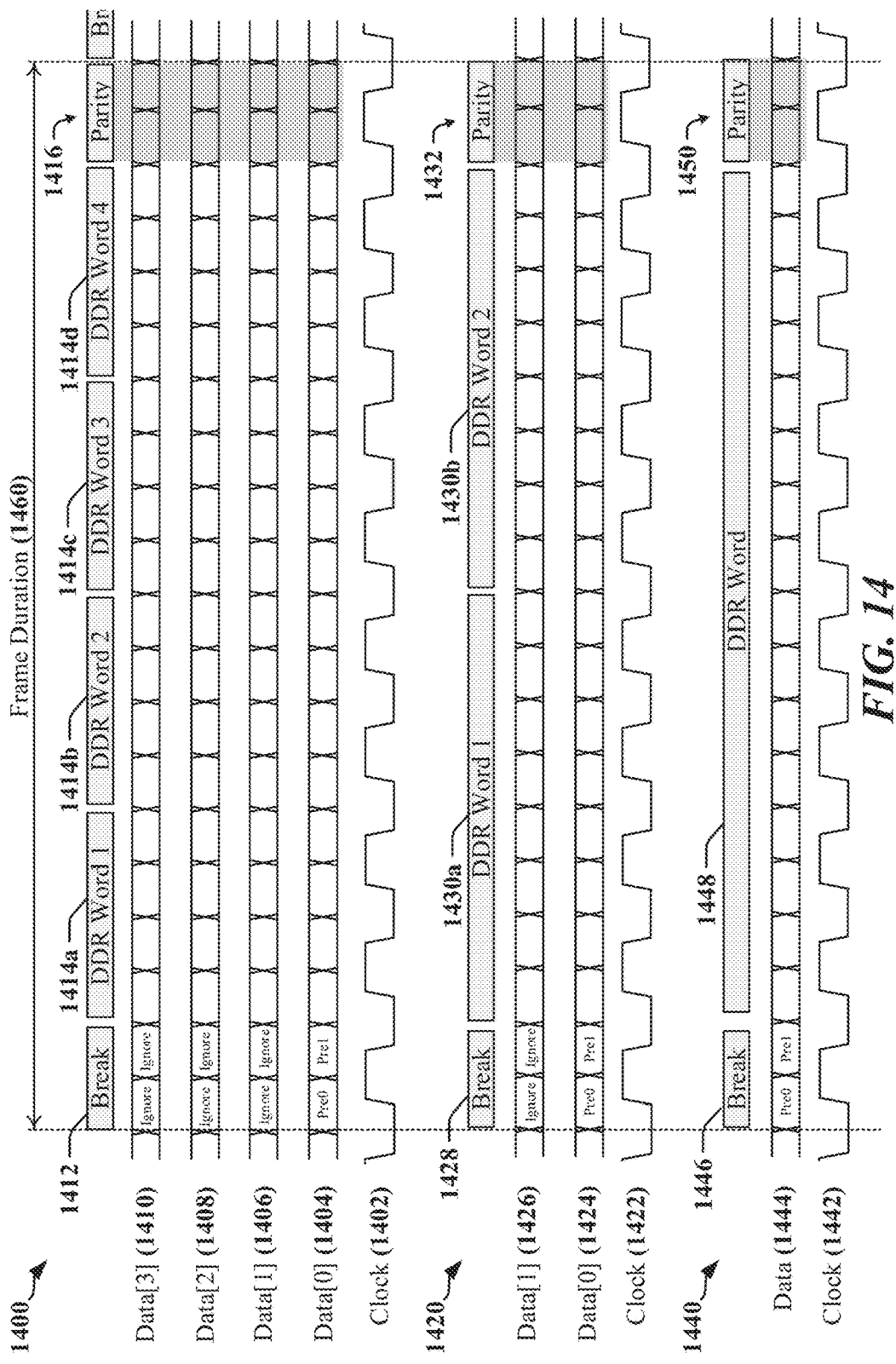
FIG. 14 illustrates second examples of data transmission data over an I3C serial bus operated in HDR-DDR mode when two or more devices can be coupled to additional connectors, lines or wires.

FIG. 14 illustrates an HDR-DDR mode of operation in which striped data may be clocked on both edges of each clock pulse in the clock signal. FIG. 14 illustrates examples 1400, 1420, 1440 of data transmission data over an I3C serial bus operated in HDR_DDR mode when two or more devices can be coupled to additional connectors, lines or wires 1012, 1014, and/or 1016. In each example, 1400, 1420, 1440 a common transaction and/or frame duration 1460 is maintained regardless of the number of additional wires used. For example, a transaction that involves the use of 2 data wires and one clock wire can communicate twice as many bits as a transaction that uses 1 data wire and one clock signal. The additional bits include payload data bits, parity bits, other protocol bits, and/or other information. For example, parity bits 1416, 1432, 1450 are transmitted concurrently with a single clock pulse on each data wire. The parity bits 1416, 1432, 1450 are transmitted in the same time-slot (relative to the start of the transaction or frame) in each example 1400, 1420, 1440. The maintenance of a common transaction and/or frame duration 1460 can maintain a constant separation between breakpoints (e.g. T-bits), and devices coupled to the bus that are configured for a conventional two-wire mode of operation remain unaware of the use of additional wires. The common transaction and/or frame duration 1460 may effectively define a cadence for bus operations.

In the first example 1440, no additional wires are used and communication proceeds using two wires (clock lane 1442 and one data lane 1444). A serialized 16-bit data word 1448 may be transmitted after two preamble bits and breakpoint 1446. Two parity bits 1450 may be transmitted after the data word 1448. In a second example 1420, one additional wire is used and communication proceeds using three wires (clock lane 1422 and two data lanes 1424, 1426). Two 16-bit data words 1430a, 1430b may be transmitted after two preamble bits and breakpoint 1428. Two parity bits 1432 may be transmitted on each data wire after the data words 1430a, 1430b, providing a total of four parity bits. In the example, the data words 1430a, 1430b are transmitted in a striped mode, whereby a first data word 1430a is completely transmitted in two-bit nibbles on the two data lanes 1424, 1426 before the second data word 1430b is transmitted. In another example 1400, three additional wires are used and communication proceeds using five wires (clock lane 1402 and four data lanes 1404, 1406, 1408, 1410). Four data words 1414a, 1414b, 1414c and 1414d may be transmitted after the preamble bits and breakpoint 1412. In the example, the data words 1414a, 1414b, 1414c, 1414d are transmitted in a striped mode, whereby a first data word 1414a is completely transmitted in four-bit nibbles on the four data lanes 1404, 1406, 1408, 1410 before the second data word 1414b is transmitted. In other implementations, data words may be transmitted in parallel on the four data lanes 1404, 1406, 1408, 1410. The preamble bits are typically transmitted on the primary data lane 1404 of the two-wire I3C bus, and signaling state of the additional connectors, lines, wires or lanes 1406, 1408, 1410 may be ignored by a receiver.

The examples 1400, 1420, 1440 illustrated in FIG. 14 provide a number of parity bits that can be used to provide enhanced error detection and correction capabilities. In one example, the parity bits transmitted on the data wire of the on the base 2-wire I3C are preserved and configured in accordance with I3C specifications. For example, a 2-bit cyclic redundancy check for the preceding data words 1448, 1430a-1430b, 1414a-1414d may be transmitted in a two-bit field. In another example, a two-bit CRC can be transmitted on each additional data lane, calculated from the bits transmitted over the corresponding additional data lane. In another example, a CRC sized according to the number of available parity bits may be calculated from the preceding data words 1448, 1430a-1430b, 1414a-1414d bits. For example, a two-bit CRC may be transmitted when no additional lines are available, a four-bit CRC may be transmitted when one additional line is available, and an eight-bit CRC may be transmitted when three additional lines are available. In another example, the parity bits may be used to implement a block-parity error detection and correction scheme.

As illustrated in certain of the examples, a multilane (ML) extension of an I3C bus may be implemented to provide increased data throughput, while keeping the I3C Interface bus management procedures. The ML version of the I3C interface permits devices of single, dual or quad data lanes to be connected on the same two-wire base lanes. ML-capable devices can be enabled a priori, with available data lanes enabled or supported.

Figure 15:
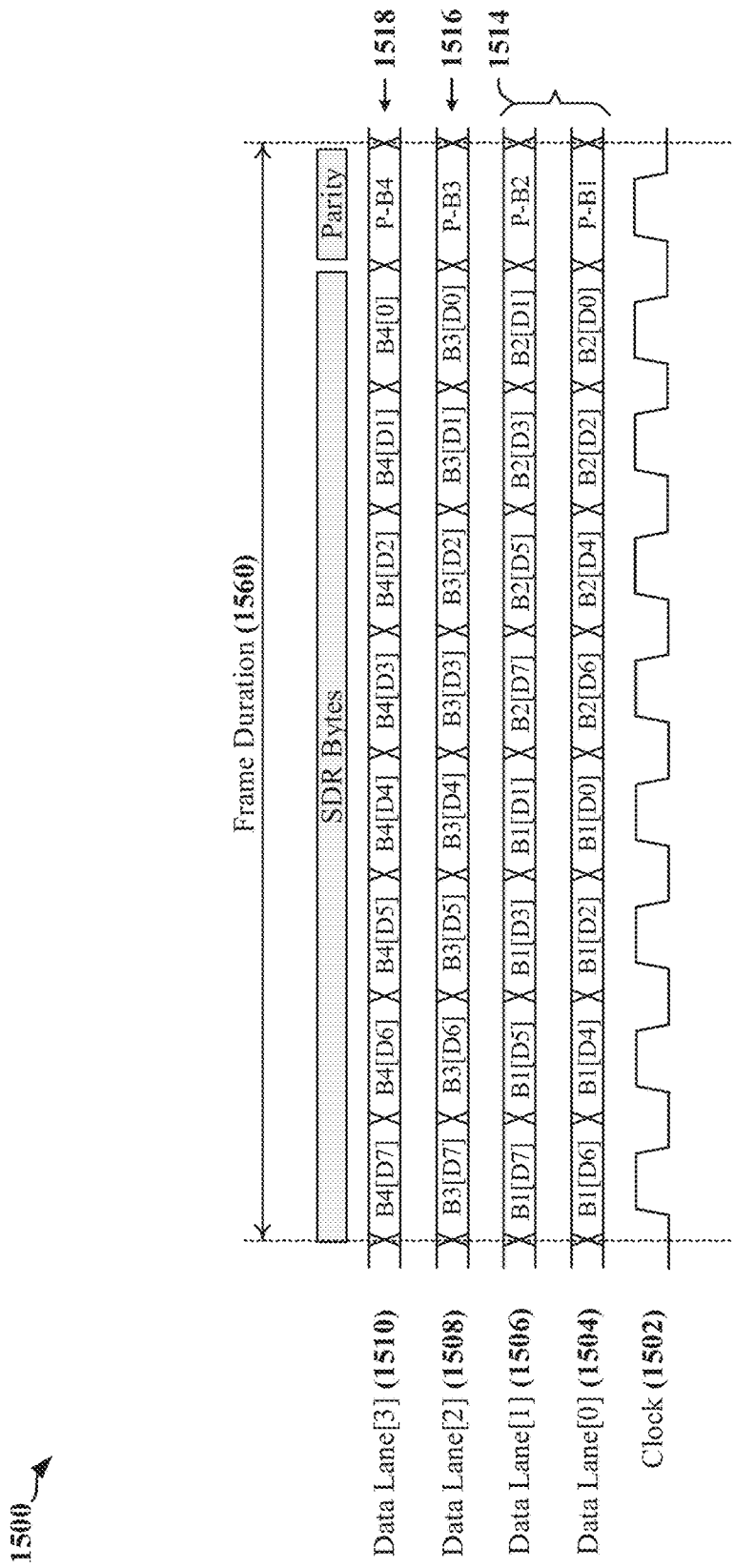
FIG. 15 illustrates an example of data transmission data over an I3C serial bus operated in SDR mode when additional connectors, lines or wires are used to carry both parallel and striped data bytes.

FIG. 15 illustrates a datagram structure 1500 in which a combination of striped and parallel byte transmissions is supported. FIG. 15 relates to data exchanges over an I3C serial bus operated in an SDR mode when two or more devices can be coupled to additional connectors, lines or wires. A common transaction and/or frame duration 1560 is maintained regardless of the number of additional lines used. Each lane or combination of lanes my carry additional bits, including payload data bits, parity bits, control bits, command bits, other protocol-defined bits and/or other information.

In the illustrated example, three additional wires are available, and communication proceeds using five wires (clock lane 1502 and four data lanes 1504, 1506, 1508, 1510). In each frame, a two-byte, striped transmission 1514 may be transmitted on the primary data lane 1504 and one secondary data lane 1506, in parallel with bytes 1516, 1518 transmitted on the other two data lanes 1508, 1510. The data lanes 1504, 1506, 1508, 1510 may be configured as desired or needed. In one example, a single byte may be transmitted on the primary data lane 1504, while two or more of the secondary data lanes 1506, 1508, 1510 may carry striped data.

Data Lane Validation Procedure for HDR Protocols

A multilane serial bus may be used to transfer large amounts of data in the least amount of time. Optimal efficiency may be achieved when each data lane is filled with useful data. In many instances, the number of data words or data bytes may not be a multiple of the number of data lanes. Consequently, the last data frame of a transaction is not always filled with useful data. For example, some data lanes of a multilane I3C interface may be left unused when data bytes or words are transmitted independently (i.e., in parallel) on individual data lanes. Padding may be used to fill unused transmission capacity with null or random data bytes or words. Certain complexities are inherent to the use of padding. For example, it is necessary to indicate to the receiver when some data lanes include padding. In some implementations, higher-level protocols may be adapted to indicate a size of data to be transferred. In other implementations, a higher-level protocol may be employed that does not indicate the size of data to be transferred, and/or large data transfers may be broken up into packets or other units that do not necessarily fill the data lanes.

According to certain aspects of the disclosure, padded data may be indicated in signaling transmitted on additional lines of a multilane serial bus during transmission of End or Restart signaling using, for example, the I3C HDR Exit 602 illustrated in FIG. 6. The I3C HDR Exit 602 is signaled by transmitting a pulse on the data wire (SDA 504) while the Clock wire (SCL 502) is driven low. In a multilane serial bus implementation, SDA 504 operates as the primary data line, and additional lanes may be idled during the transmission of End or Restart signaling in conventional implementations. In accordance with certain aspects disclosed herein, the additional lanes may be used to explicitly indicate whether padding was transmitted on the additional line during the preceding frame.

Figure 16:
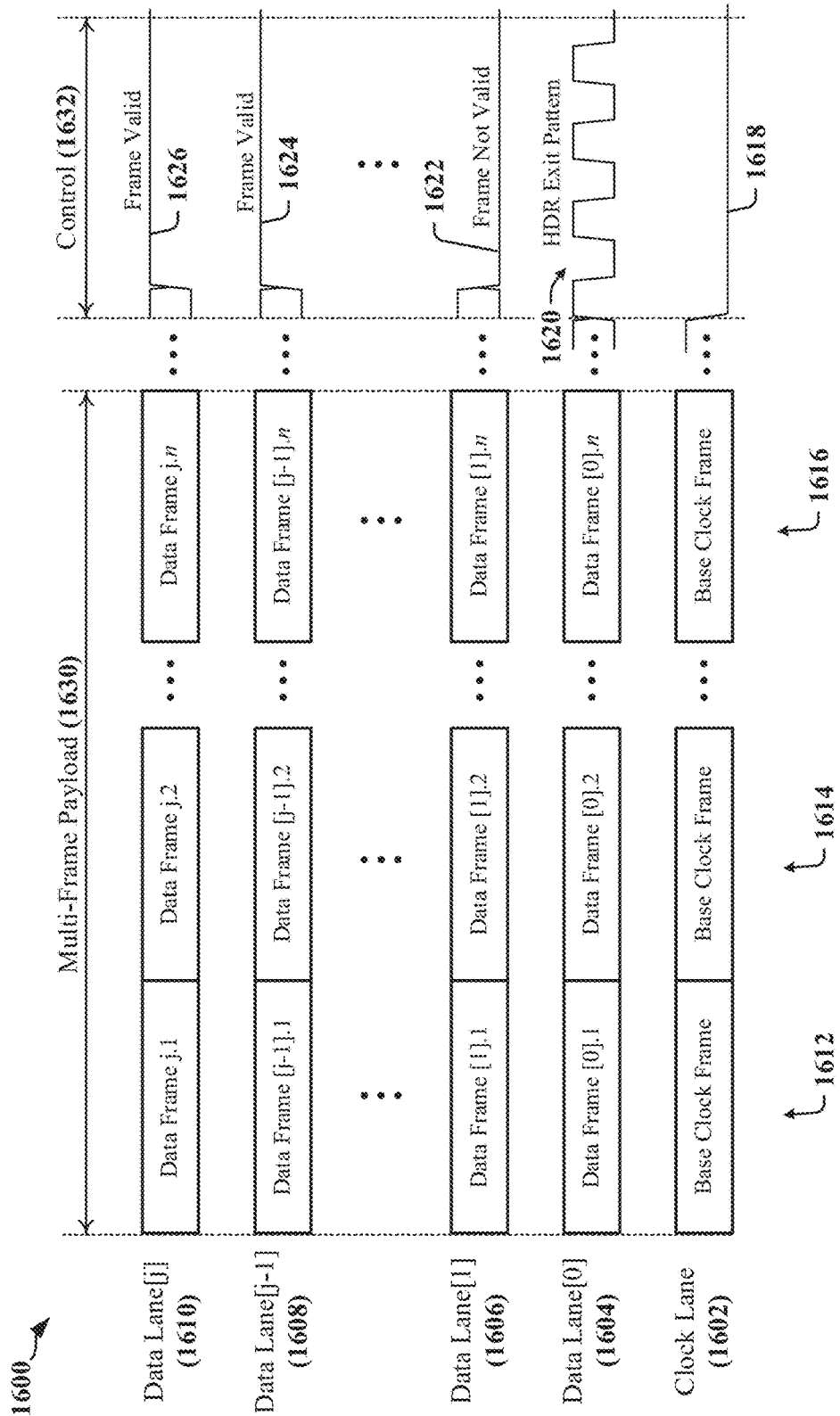
FIG. 16 illustrates an example of signaling provided on additional data lanes of a serial bus during HDR Exit signaling in accordance with certain aspects disclosed herein.

FIG. 16 illustrates an example 1600 of signaling 1622, 1624, 1626 provided on additional data lanes 1606, 1608, 1610 of a serial bus during a period 1632 when an HDR Exit pattern 1620 is transmitted on the data lane 1604 while the clock lane 1602 is idle and/or in a low state 1618 after transmission of a multi-frame payload 1630. The payload 1630 is transmitted as a number (n) of frames including data frames 1612, 1614, 1616. Data words may be transmitted on the primary data lane 1604 and on a number (j) of additional data lanes 1606, 1608, 1610. In some instances, one or more of the additional data lanes 1606, 1608, 1610 may be idle or may carry a padding value during transmission of the last (nth) data frame 1616. In some implementations, the content of the nth data frame 1616 on each additional data lane 1606, 1608, 1610 may be indicated by signaling state 1622, 1624, 1626 of the additional data lane 1606, 1608, 1610 during transmission of the HDR Exit pattern 1620. In the illustrated example, the nth data frame 1616 transmitted on an additional data lane 1608, 1610 includes valid data when the additional data lane 1608, 1610 is in a high signaling state during transmission of the HDR Exit pattern 1620. The nth data frame 1616 on an additional data lane 1606 includes padding, or invalid data when the additional data lane 1606 is in a low signaling state during transmission of the HDR Exit pattern 1620. The selection of signaling state to represent valid or invalid data may be determined by application needs and other design considerations.

Figure 17:
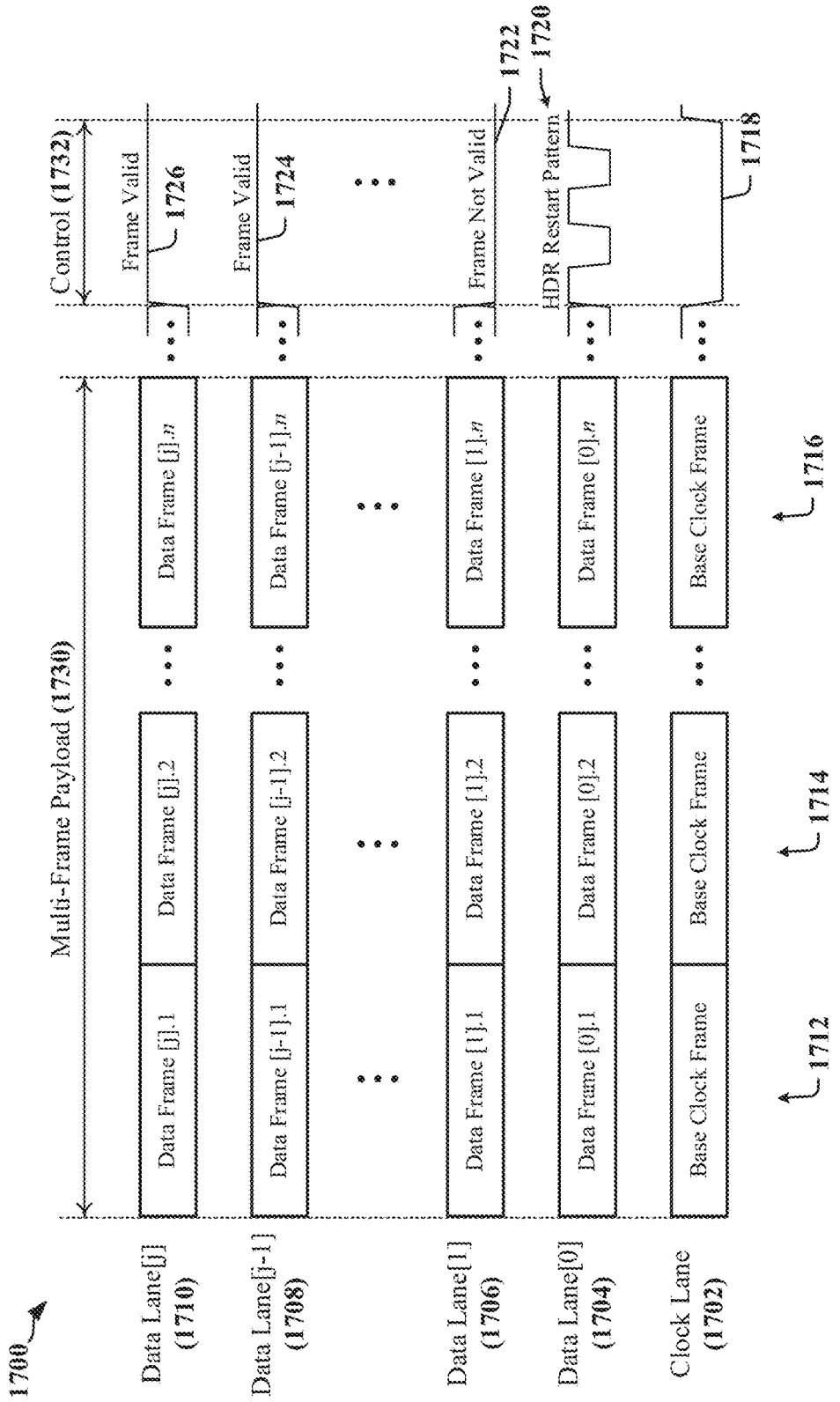
FIG. 17 illustrates an example of signaling provided on additional data lanes of a serial bus during HDR Restart signaling in accordance with certain aspects disclosed herein.

FIG. 17 illustrates an example 1700 of signaling 1722, 1724, 1726 provided on additional data lanes 1706, 1708, 1710 of a serial bus during a period 1732 when an HDR Restart pattern 1720 is transmitted on the data lane 1704 while the clock lane 1702 is idle and/or in a low state 1718 after transmission of a multi-frame payload 1730. The payload 1730 is transmitted as a number (n) of frames including data frames 1712, 1714, 1716. Data words may be transmitted on the primary data lane 1704 and on a number (j) of additional data lanes 1706, 1708, 1710. In some instances, one or more of the additional data lanes 1706, 1708, 1710 may be idle or may carry a padding value during transmission of the last (nth) data frame 1716. In some implementations, the content of the nth data frame 1716 on each additional data lane 1706, 1708, 1710 may be indicated by signaling state 1722, 1724, 1726 of the additional data lane 1706, 1708, 1710 during transmission of the HDR Restart pattern 1720. In the illustrated example, the nth data frame 1716 on an additional data lane 1708, 1710 includes valid data when the additional data lane 1708, 1710 is in a high signaling state during transmission of the HDR Restart pattern 1720. The nth data frame 1716 on an additional data lane 1706 includes padding, or invalid data when the additional data lane 1706 is in a low signaling state during transmission of the HDR Restart pattern 1720. The selection of signaling state to represent valid or invalid data may be determined by application needs and other design considerations.

Other types of signaling may be carried on additional data lanes of a serial bus during HDR Restart or Exit pattern. The other types of signaling may include control signaling and other out-of-band signals that can be encoded on the additional data lanes. Data may be encoded in multi-bit values transmitted on the additional data lanes. In certain examples, the out-of-band signaling may indicate how many striped words are valid in a last data frame.

Figure 18:
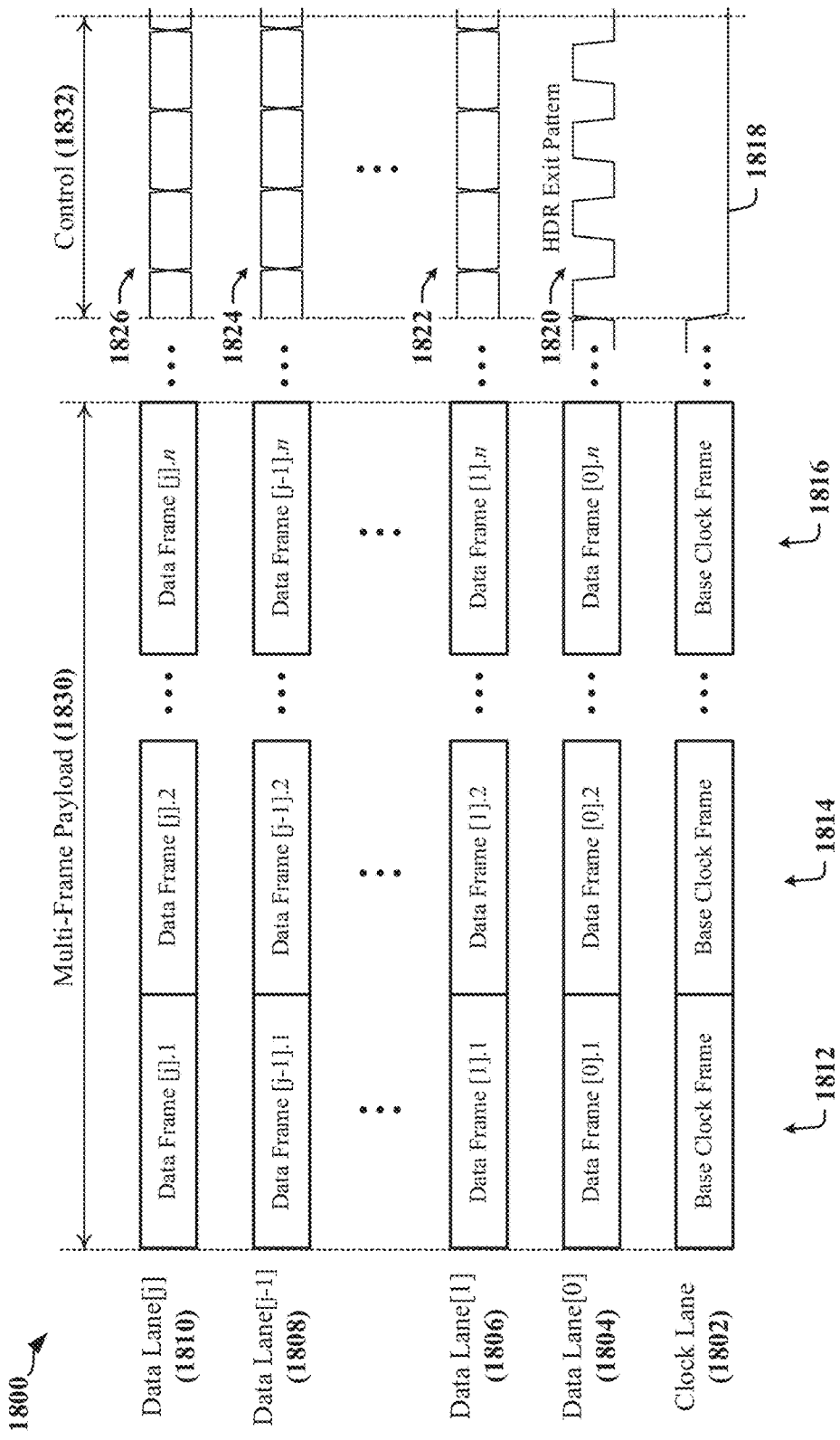
FIG. 18 illustrates an example of multi-bit signaling provided on additional data lanes of a serial bus during HDR Exit signaling in accordance with certain aspects disclosed herein.

FIG. 18 illustrates an example 1800 of multi-bit signaling 1822, 1824, 1826 provided on additional data lanes 1806, 1808, 1810 of a serial bus during a period 1832 when an HDR Exit pattern 1820 is transmitted on the data lane 1804 while the clock lane 1802 is idle and/or in a low state 1818 after transmission of a multi-frame payload 1830. The payload 1830 is transmitted as a number (n) of frames including data frames 1812, 1814, 1816. Data words may be transmitted on the primary data lane 1804 and on a number (j) of additional data lanes 1806, 1808, 1810. The data words may be transmitted in parallel or striped. In some instances, one or more of the additional data lanes 1806, 1808, 1810 may be idle or may carry a padding value during transmission of the last (nth) data frame 1816. In some implementations, the content of the nth data frame 1816 on each additional data lane 1806, 1808, 1810 may be indicated by multi-bit information encoded in one or more of the additional data lanes 1806, 1808, 1810 during transmission of the HDR Exit pattern 1820. Multiple bits 1822, 1824, 1826 may be transmitted in accordance with timing provided by pulses in the HDR Exit pattern 1820. In one example, a first bit indicates that the nth data frame 1816 on an additional data lane 1808, 1810 includes valid data when the additional data lane 1808, 1810 is in a high signaling state during transmission of the HDR Exit pattern 1820, and the additional data lane 1806 includes padding, or invalid data when the first bit is in a low signaling state during transmission of the HDR Exit pattern 1820. The selection of signaling state to represent valid or invalid data may be determined by application needs and other design considerations. In another example, two bits are transmitted on one or more additional data lanes 1806, 1808, 1810 during the HDR Exit pattern 1820 to indicate the number of valid nibbles striped across the primary data lane 1804 and the additional data lanes 1806, 1808, 1810.

Figure 19:
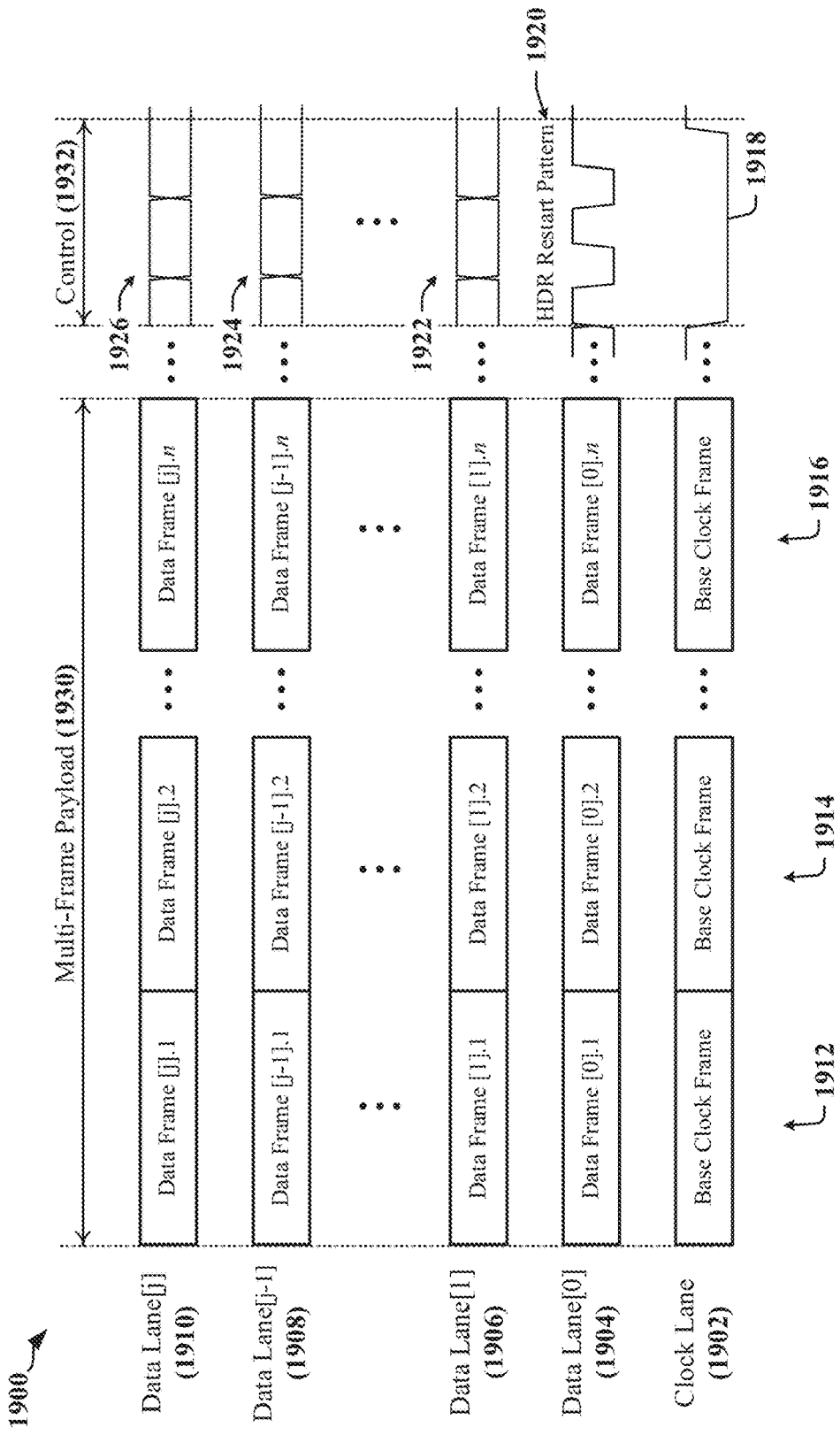
FIG. 19 illustrates an example of multi-bit signaling provided on additional data lanes of a serial bus during HDR Restart signaling in accordance with certain aspects disclosed herein.

FIG. 19 illustrates an example 1900 of multi-bit signaling 1922, 1924, 1926 provided on additional data lanes 1906, 1908, 1910 of a serial bus during a period 1932 when an HDR Restart pattern 1920 is transmitted on the data lane 1904 while the clock lane 1902 is idle and/or in a low state 1918 after transmission of a multi-frame payload 1930. The payload 1930 is transmitted as a number (n) of frames including frames 1912, 1914, 1916. Data words may be transmitted on the primary data lane 1904 and on a number (j) of additional data lanes 1906, 1908, 1910. The data words may be transmitted in parallel or striped. In some instances, one or more of the additional data lanes 1906, 1908, 1910 may be idle or may carry a padding value during transmission of the last (nth) data frame 1916. In some implementations, the content of the nth data frame 1916 on each additional data lane 1906, 1908, 1910 may be indicated by multi-bit information encoded in one or more of the additional data lanes 1906, 1908, 1910 during transmission of the HDR Restart signaling 1920. Multiple bits 1922, 1924, 1926 may be transmitted in accordance with timing provided by pulses in the HDR Restart signaling 1920. In one example, a first bit indicates that the nth data frame 1916 on an additional data lane 1908, 1910 includes valid data when the additional data lane 1908, 1910 is in a high signaling state during transmission of the HDR Restart signaling 1920, and the additional data lane 1906 includes padding, or invalid data when the first bit is in a low signaling state during transmission of the HDR Restart signaling 1920. The selection of signaling state to represent valid or invalid data may be determined by application needs and other design considerations. In another example, two bits are transmitted on one or more additional data lanes 1906, 1908, 1910 during the HDR Restart signaling 1920 to indicate the number of valid nibbles striped across the primary data lane 1904 and the additional data lanes 1906, 1908, 1910.

Figure 20:
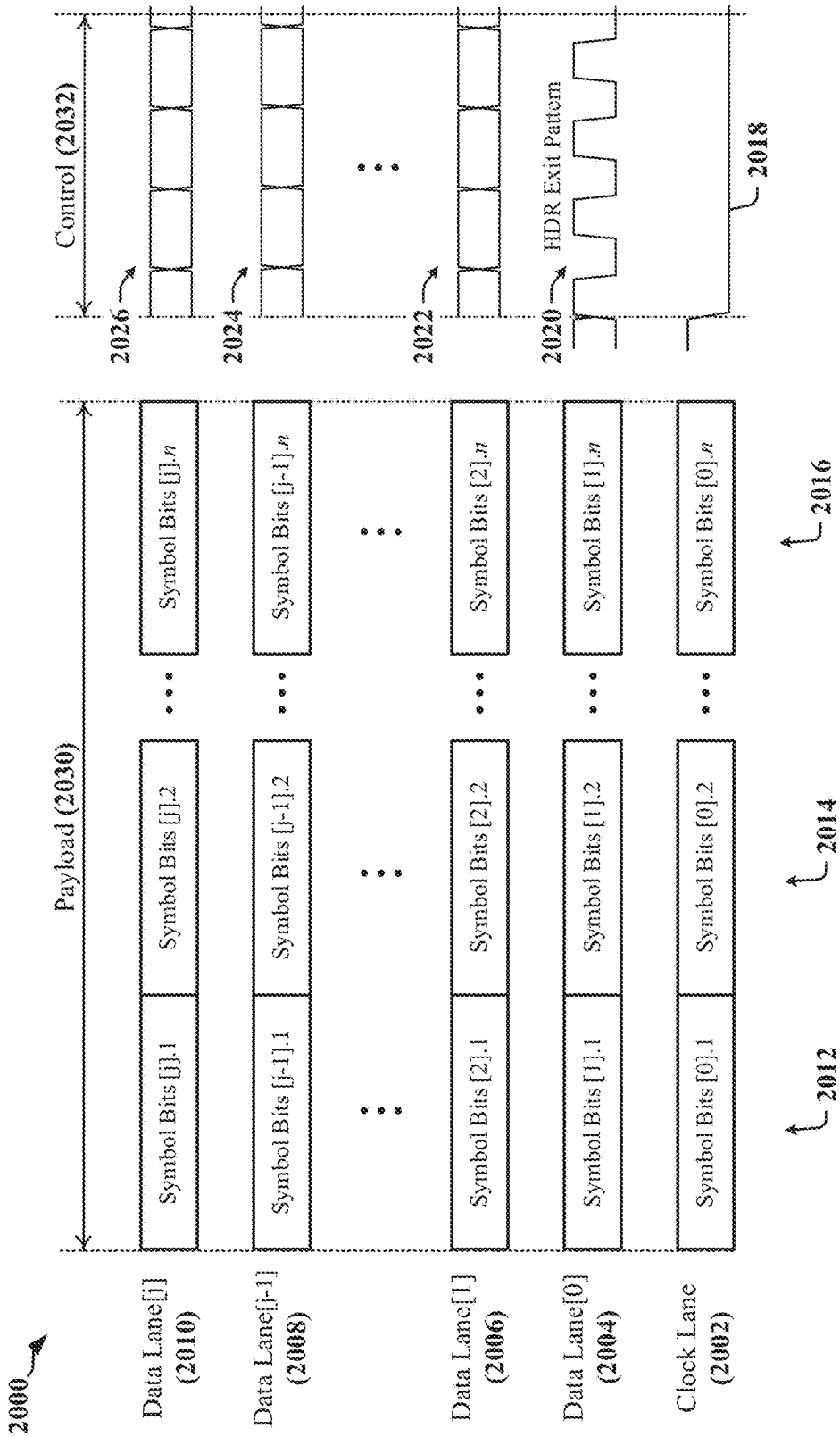
FIG. 20 illustrates a first example of multi-bit signaling provided on additional data lanes of a serial bus during HDR Restart signaling after a phase differential encoded transmission in accordance with certain aspects disclosed herein.

FIG. 20 illustrates a first example 2000 of a phase-differential encoded payload 2030 in which multi-bit signaling 2022, 2024, 2026 is provided on one or more additional data lanes 2006, 2008, 2010 of a serial bus during a period 2032 when an HDR Exit pattern 2020 is transmitted on the data lane 2004 while the clock lane 2002 is idle and/or in a low state 2018 after transmission of the payload 2030. The payload 2030 is encoded in symbols transmitted over the clock lane 2002, the data lane 2004 and the additional data lanes 2006, 2008, 2010 in each of a number (n) of sequences of symbols 2012, 2014, 2016. In some instances, one or more symbols in the last-transmitted (nth) sequence of symbols 2016 may be invalid or encoded with a padding value. In some implementations, the number of valid symbols in the nth sequence of symbols 2016 may be indicated by multi-bit information encoded in one or more of the additional data lanes 2006, 2008, 2010 during transmission of the HDR Exit pattern 2020. Multi-bit signaling 2022, 2024, 2026 may be transmitted in accordance with timing provided by pulses in the HDR Exit pattern 2020. In one example, bits transmitted on one or more additional data lanes 2006, 2008, 2010 during the HDR Exit pattern 2020 indicate the number of valid symbols transmitted using the clock lane 2002, the data lane 2004 and one or more additional data lanes 2006, 2008, 2010.

Figure 21:
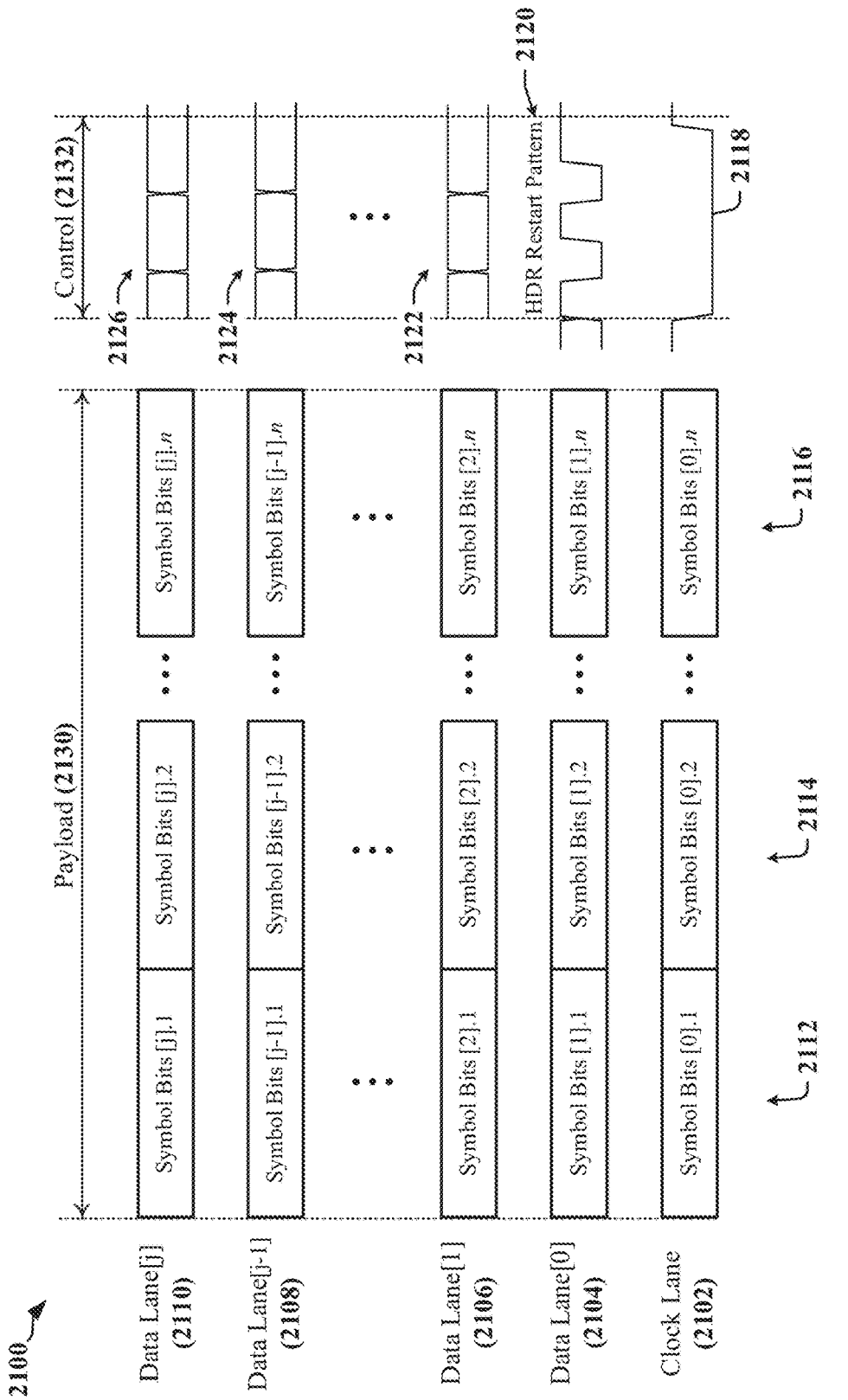
FIG. 21 illustrates a second example of multi-bit signaling provided on additional data lanes of a serial bus during HDR Restart signaling after a phase differential encoded transmission in accordance with certain aspects disclosed herein.

FIG. 21 illustrates a second example 2100 of a phase-differential encoded payload 2130 in which multi-bit signaling 2122, 2124, 2126 is provided on one or more additional data lanes 2106, 2108, 2110 of a serial bus during a period 2132 when an HDR Restart pattern 2120 is transmitted on the data lane 2104 while the clock lane 2102 is idle and/or in a low state 2118 after transmission of the payload 2130. The payload 2130 is encoded in symbols transmitted over the clock lane 2102, the data lane 2104 and the additional data lanes 2106, 2108, 2110 in each of a number (n) of sequences of symbols 2112, 2114, 2116. In some instances, one or more symbols in the last-transmitted (nth) sequence of symbols 2116 may be invalid or encoded with a padding value. In some implementations, the content of the nth sequence of symbols 2116 may be indicated by multi-bit information encoded in one or more of the additional data lanes 2106, 2108, 2110 during transmission of the HDR Restart pattern 2120. Multi-bit signaling 2122, 2124, 2126 may be transmitted in accordance with timing provided by pulses in the HDR Restart pattern 2120. In one example, bits transmitted on one or more additional data lanes 2106, 2108, 2110 during the HDR Restart pattern 2120 indicate the number of valid symbols transmitted using the clock lane 2102, the data lane 2104 and one or more additional data lanes 2106, 2108, 2110.

In some implementations, a combination of different HDR modes may be employed on a multi-lane serial bus. For example, HDR-DDR mode transmissions may involve the clock lane and one or more data lanes, while two or more additional lanes may be used to carry phase differential encoded data.

Examples of Processing Circuits and Methods

Figure 22:
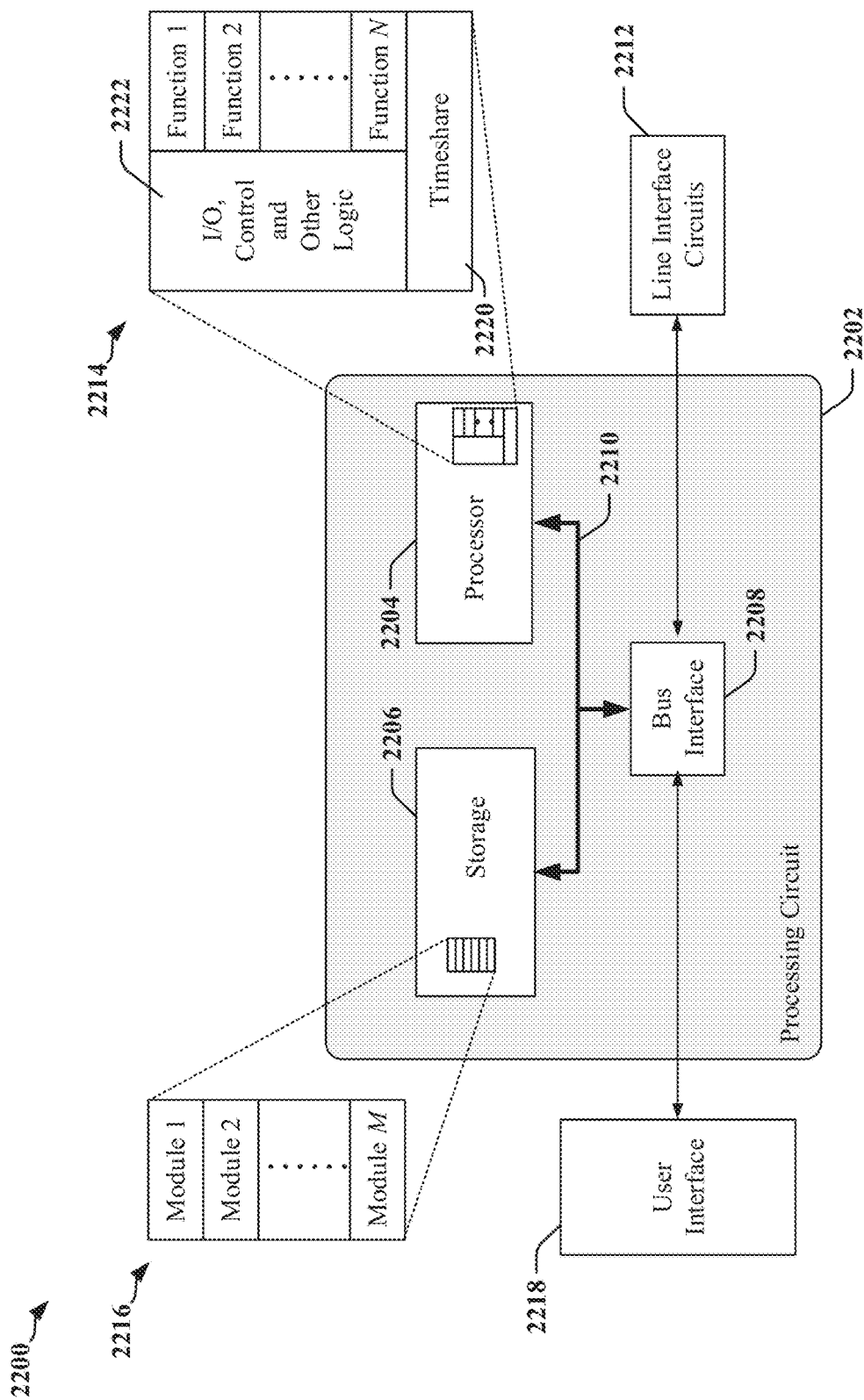
FIG. 22 illustrates an example of an apparatus employing a processing circuit that may be adapted according to certain aspects disclosed herein.

FIG. 22 is a diagram illustrating an example of a hardware implementation for an apparatus 2200 employing a processing circuit 2202 that may be configured to perform one or more functions disclosed herein. In accordance with various aspects of the disclosure, an element, or any portion of an element, or any combination of elements as disclosed herein may be implemented using the processing circuit 2202. The processing circuit 2202 may include one or more processors 2204 that are controlled by some combination of hardware and software modules. Examples of processors 2204 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 2204 may include specialized processors that perform specific functions, and that may be configured, augmented or controlled by one of the software modules 2216. The one or more processors 2204 may be configured through a combination of software modules 2216 loaded during initialization, and further configured by loading or unloading one or more software modules 2216 during operation. In various examples, the processing circuit 2202 may be implemented using a state machine, sequencer, signal processor and/or general-purpose processor, or a combination of such devices and circuits.

In the illustrated example, the processing circuit 2202 may be implemented with a bus architecture, represented generally by the bus 2210. The bus 2210 may include any number of interconnecting buses and bridges depending on the specific application of the processing circuit 2202 and the overall design constraints. The bus 2210 links together various circuits including the one or more processors 2204, and storage 2206. Storage 2206 may include memory devices and mass storage devices, and may be referred to herein as computer-readable media and/or processor-readable media. The bus 2210 may also link various other circuits such as timing sources, timers, peripherals, voltage regulators, and power management circuits. A bus interface 2208 may provide an interface between the bus 2210 and one or more transceivers 2212. A transceiver 2212 may be provided for each networking technology supported by the processing circuit. In some instances, multiple networking technologies may share some or all of the circuitry or processing modules found in a transceiver 2212. Each transceiver 2212 provides a means for communicating with various other apparatus over a transmission medium. Depending upon the nature of the apparatus 2200, a user interface 2218 (e.g., keypad, display, speaker, microphone, joystick) may also be provided, and may be communicatively coupled to the bus 2210 directly or through the bus interface 2208.

A processor 2204 may be responsible for managing the bus 2210 and for general processing that may include the execution of software stored in a computer-readable medium that may include the storage 2206. In this respect, the processing circuit 2202, including the processor 2204, may be used to implement any of the methods, functions and techniques disclosed herein. The storage 2206 may be used for storing data that is manipulated by the processor 2204 when executing software, and the software may be configured to implement any one of the methods disclosed herein.

One or more processors 2204 in the processing circuit 2202 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 2206 or in an external computer-readable medium. The external computer-readable medium and/or storage 2206 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 2206 may also include, by way of example, a carrier wave, a transmission line, and any other suitable medium for transmitting software and/or instructions that may be accessed and read by a computer. Computer-readable medium and/or the storage 2206 may reside in the processing circuit 2202, in the processor 2204, external to the processing circuit 2202, or be distributed across multiple entities including the processing circuit 2202. The computer-readable medium and/or storage 2206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 2206 may maintain software maintained and/or organized in loadable code segments, modules, applications, programs, etc., which may be referred to herein as software modules 2216. Each of the software modules 2216 may include instructions and data that, when installed or loaded on the processing circuit 2202 and executed by the one or more processors 2204, contribute to a run-time image 2214 that controls the operation of the one or more processors 2204. When executed, certain instructions may cause the processing circuit 2202 to perform functions in accordance with certain methods, algorithms and processes described herein.

Some of the software modules 2216 may be loaded during initialization of the processing circuit 2202, and these software modules 2216 may configure the processing circuit 2202 to enable performance of the various functions disclosed herein. For example, some software modules 2216 may configure internal devices and/or logic circuits 2222 of the processor 2204, and may manage access to external devices such as the transceiver 2212, the bus interface 2208, the user interface 2218, timers, mathematical coprocessors, and so on. The software modules 2216 may include a control program and/or an operating system that interacts with interrupt handlers and device drivers, and that controls access to various resources provided by the processing circuit 2202. The resources may include memory, processing time, access to the transceiver 2212, the user interface 2218, and so on.

One or more processors 2204 of the processing circuit 2202 may be multifunctional, whereby some of the software modules 2216 are loaded and configured to perform different functions or different instances of the same function. The one or more processors 2204 may additionally be adapted to manage background tasks initiated in response to inputs from the user interface 2218, the transceiver 2212, and device drivers, for example. To support the performance of multiple functions, the one or more processors 2204 may be configured to provide a multitasking environment, whereby each of a plurality of functions is implemented as a set of tasks serviced by the one or more processors 2204 as needed or desired. In one example, the multitasking environment may be implemented using a timesharing program 2220 that passes control of a processor 2204 between different tasks, whereby each task returns control of the one or more processors 2204 to the timesharing program 2220 upon completion of any outstanding operations and/or in response to an input such as an interrupt. When a task has control of the one or more processors 2204, the processing circuit is effectively specialized for the purposes addressed by the function associated with the controlling task. The timesharing program 2220 may include an operating system, a main loop that transfers control on a round-robin basis, a function that allocates control of the one or more processors 2204 in accordance with a prioritization of the functions, and/or an interrupt driven main loop that responds to external events by providing control of the one or more processors 2204 to a handling function.

Figure 23:
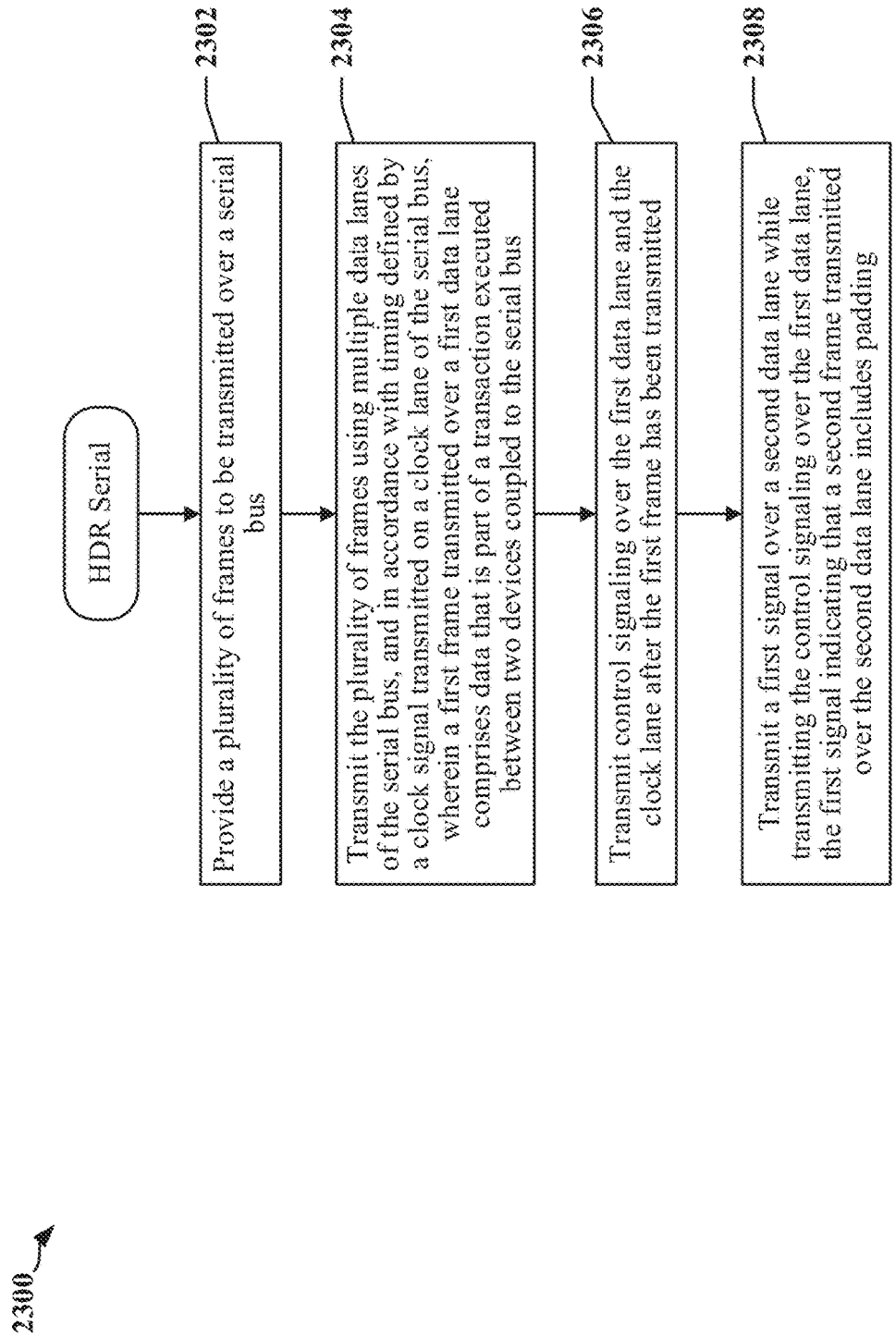
FIG. 23 is a flowchart illustrating a first example of a process that may be performed at a sending device coupled to a serial bus in accordance with certain aspects disclosed herein.

FIG. 23 is a flowchart 2300 illustrating a first example of a process that may be performed at a device coupled to a serial bus having multiple data lanes. In one example, the serial bus includes at 4 data lanes. In another example, the serial bus includes more than 4 data lanes. In another example, the serial bus includes less than 4 data lanes. The device may be operable to manage certain aspects of data transmissions over the serial bus. At block 2302, the device may provide a plurality of frames to be transmitted over the serial bus. At block 2304, the device may transmit the plurality of frames using multiple data lanes of the serial bus, and in accordance with timing defined by a clock signal transmitted on a clock lane of the serial bus. A first frame transmitted over a first data lane may include data that is part of a transaction executed between two devices coupled to the serial bus. At block 2306, the device may transmit control signaling over the first data lane and the clock lane after the first frame has been transmitted. At block 2308, the device may transmit a first signal over a second data lane while transmitting the control signaling over the first data lane. The first signal may indicate that a second frame transmitted over the second data lane includes padding. For example, a first state of the first signal may indicate valid data, while a second state of the first signal may indicate invalid data.

In one example, the control signaling includes a restart pattern and/or an exit pattern when the serial bus is operated in accordance with an I3C high data rate protocol. In another example, the serial bus is operated in accordance with a second protocol, and the control signaling includes a repeated start condition, a stop condition, or the like.

In certain examples, a second signal may be transmitted over a third data lane while the control signaling is transmitted over the first data lane. The second signal may indicate that a third frame transmitted over the third data lane includes data that is part of the transaction. For example, a first state of the second signal may indicate that the frame transmitted on the third data lane included valid data, while a second state of the second signal may indicate that the frame transmitted on the third data lane included padding. The plurality of frames to be transmitted over the serial bus may be provided by populating the first frame with a single byte or word that is part of the transaction, and populating second frame with a padding byte or word. The plurality of frames to be transmitted over the serial bus may be provided by populating the third frame with another byte or word that is part of the transaction. The plurality of frames to be transmitted over the serial bus may be provided by striping one or more bytes or words of the transaction across the plurality of frames, where the one or more bytes or words may be insufficient to fully populate the plurality of frames. The first signal and the second signal each include one or more bits.

In various examples, the first signal carries control information encoded in at least one bit. Each bit of the first signal may be transmitted in accordance with timing defined by pulses in the control signaling. The first signal may carry a plurality of bits. The control information may indicate a number of bytes or words of the transaction that are striped across the plurality of frames. The control information may indicate a number of padding bytes or words that are striped across the plurality of frames.

Figure 24:
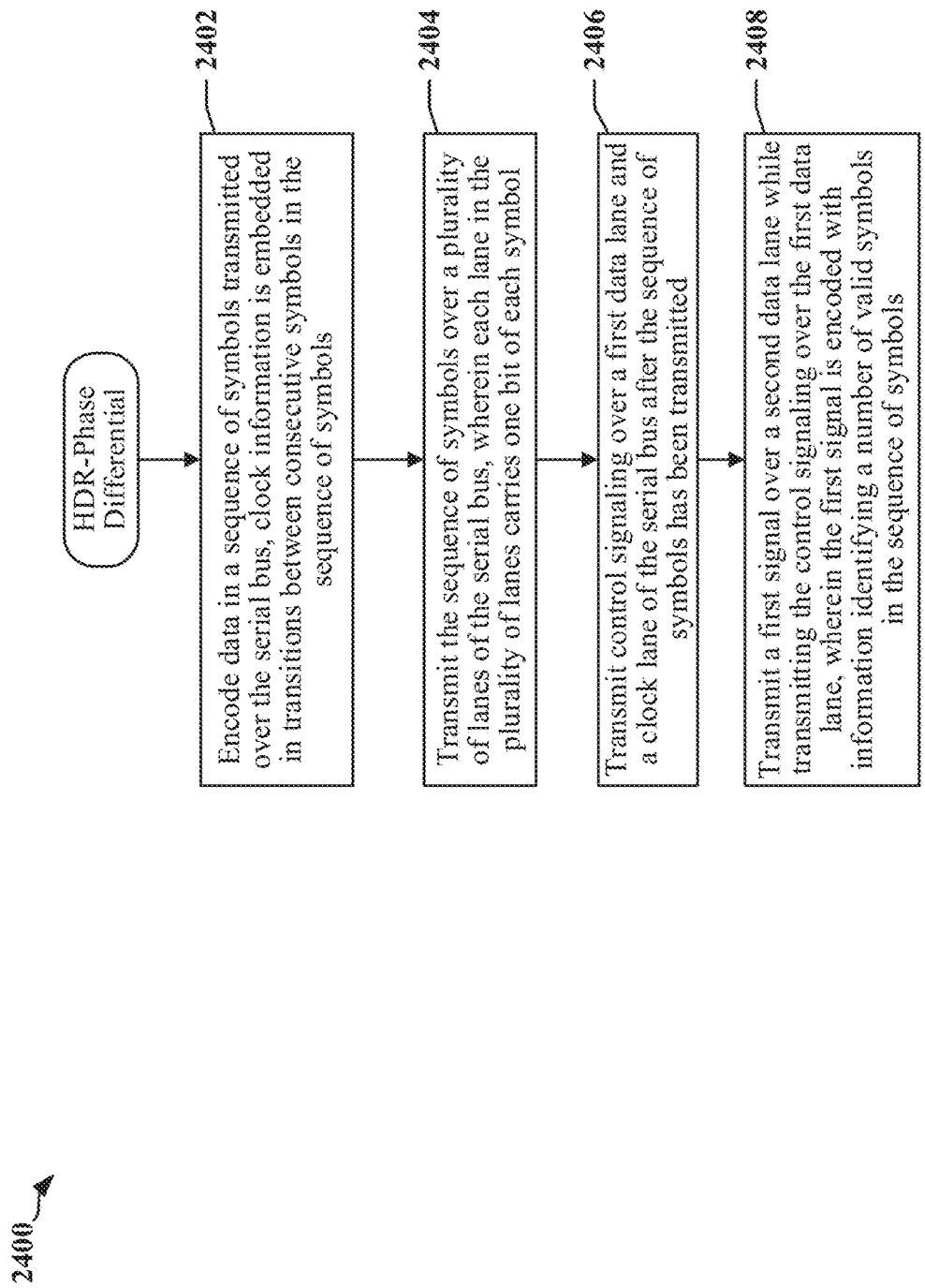
FIG. 24 is a flowchart illustrating a second example of a process that may be performed at a sending device coupled to a serial bus in accordance with certain aspects disclosed herein.

FIG. 24 is a flowchart 2400 illustrating a second example of a process that may be performed at a device coupled to a serial bus having multiple data lanes. The device may be operable to manage certain aspects of data transmissions over the serial bus. At block 2402, the device may encode data in a sequence of symbols transmitted over the serial bus. Each bit of each symbol may determine signaling state of a data lane and clock information is embedded in transitions between consecutive symbols in the sequence of symbols. At block 2404, the device may transmit the sequence of symbols over a plurality of lanes of the serial bus. Each lane in the plurality of lanes carries one bit of each symbol.

At block 2406, the device may transmit control signaling over a first data lane and a clock lane of the serial bus after the sequence of symbols has been transmitted. At block 2408, the device may transmit a first signal over a second data lane while transmitting the control signaling over the first data lane. The first signal is encoded with information identifying a number of valid symbols in the sequence of symbols.

In one example, the control signaling includes a restart pattern and/or an exit pattern when the serial bus is operated in accordance with an I3C high data rate protocol. In another example, the serial bus is operated in accordance with a second protocol, and the control signaling includes a repeated start condition, a stop condition, or the like.

In certain examples, the device may transmit a second signal over a third data lane while transmitting the control signaling over the first data lane. The first signal and the second signal may identify the number of valid symbols in the sequence of symbols.

In one example, the device may transmit a second signal over a third data lane while transmitting the control signaling over the first data lane. The first signal and the second signal may identify the number of symbols in the sequence of symbols that carry invalid or padding data.

In some examples, the device may transmit the sequence of symbols over the plurality of lanes of the serial bus by transmitting a bit of each symbol over the clock lane of the serial bus.

In various examples, the device may transmit a plurality of frames over at least one data lane of the serial bus in accordance with timing defined by a clock signal transmitted on the clock lane of the serial bus while the sequence of symbols is being transmitted over the plurality of lanes of the serial bus.

Figure 25:
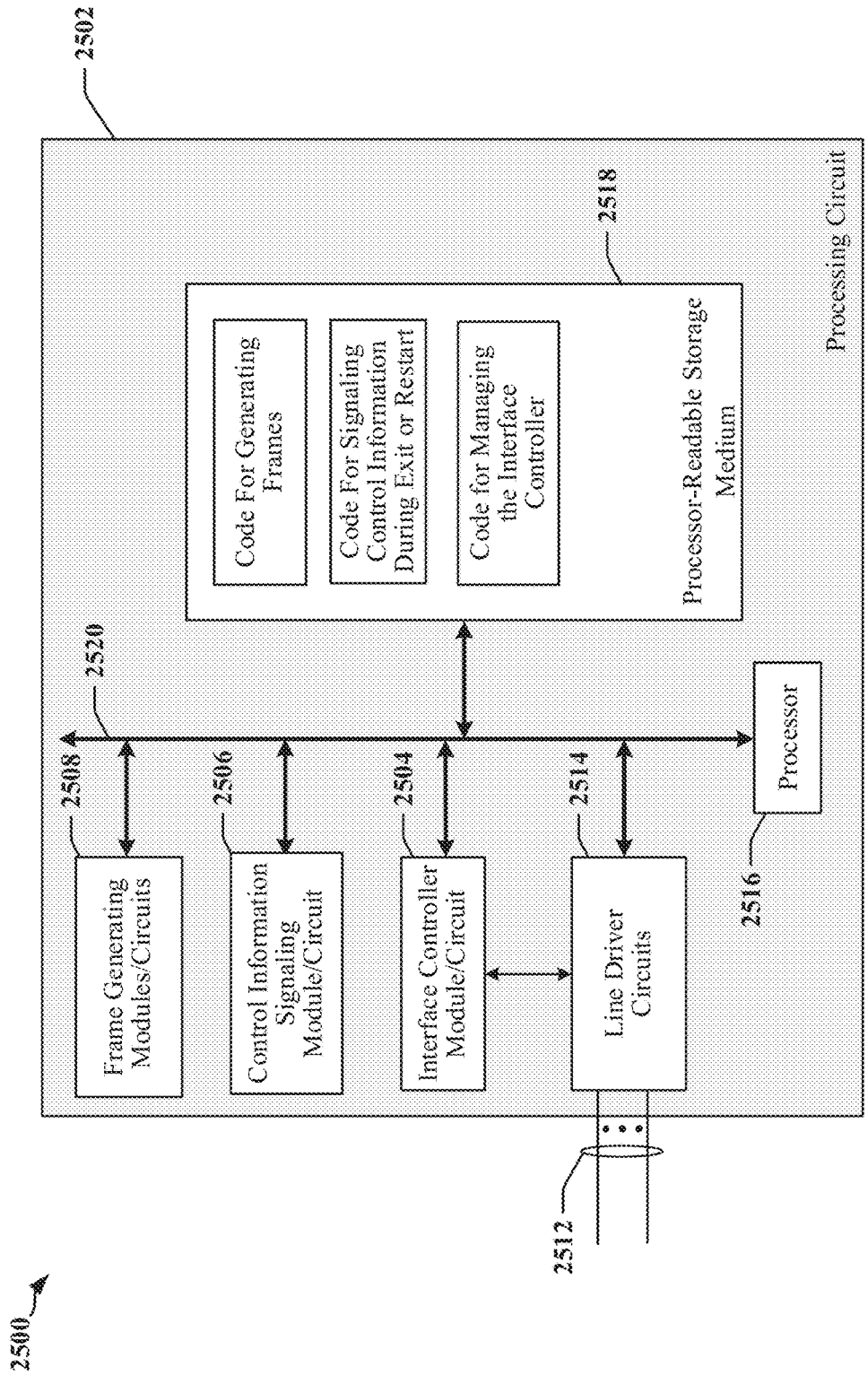
FIG. 25 illustrates a hardware implementation for a transmitting apparatus adapted to respond to support multi-lane operation of a serial bus in accordance with certain aspects disclosed herein.

FIG. 25 is a diagram illustrating a simplified example of a hardware implementation for an apparatus 2500 employing a processing circuit 2502. The processing circuit typically has a controller or processor 2516 that may include one or more microprocessors, microcontrollers, digital signal processors, sequencers and/or state machines. The processing circuit 2502 may be implemented with a bus architecture, represented generally by the bus 2520. The bus 2520 may include any number of interconnecting buses and bridges depending on the specific application of the processing circuit 2502 and the overall design constraints. The bus 2520 links together various circuits including one or more processors and/or hardware modules, represented by the controller or processor 2516, the modules or circuits 2504, 2506 and 2508, and the processor-readable storage medium 2518. The apparatus may be coupled to a multi-wire communication link using a physical layer circuit 2514. The physical layer circuit 2514 may operate the multi-wire communication link 2512 to support communications in accordance with I3C protocols. The bus 2520 may also link various other circuits such as timing sources, peripherals, voltage regulators, and power management circuits, which are well known in the art, and therefore, will not be described any further.

The processor 2516 is responsible for general processing, including the execution of software, code and/or instructions stored on the processor-readable storage medium 2518. The computer-readable storage medium may include a non-transitory storage medium. The software, when executed by the processor 2516, causes the processing circuit 2502 to perform the various functions described supra for any particular apparatus. The computer-readable storage medium may be used for storing data that is manipulated by the processor 2516 when executing software. The processing circuit 2502 further includes at least one of the modules 2504, 2506 and 2508. The modules 2504, 2506 and 2508 may be software modules running in the processor 2516, resident/stored in the processor-readable storage medium 2518, one or more hardware modules coupled to the processor 2516, or some combination thereof. The modules 2504, 2506 and 2508 may include microcontroller instructions, state machine configuration parameters, or some combination thereof.

In one configuration, the apparatus 2500 includes an interface controller 2504, and a physical layer circuit 2514 including a first line driver coupled to a first wire of a multi-wire serial bus and a second line driver coupled to a second wire of the multi-wire communication link 2512. The apparatus 2500 may include modules and/or circuits 2504 coupled to the physical layer circuit 2514 and configured to transmit data over the serial bus. The apparatus 2500 may include modules and/or circuits 2508 configured to generate frames, where each frame may include a single byte or word, or where one or more bytes or words may be striped across all frames transmitted concurrently on the serial bus. The apparatus 2500 may include modules and/or circuits 2506 configured to encode control or other information in signaling transmitted on one or more secondary data lanes while control signaling is transmitted on a primary data lane.

The apparatus 2500 may include a bus interface configured to couple the apparatus 2500 to a multi-wire communication link 2512, and a controller or other processor. The controller may be configured to provide a plurality of frames to be transmitted over the serial bus, transmit the plurality of frames over a corresponding number of data lanes of the serial bus in accordance with timing defined by a clock signal transmitted on a clock lane of the serial bus, transmit control signaling over the first data lane and the clock lane after the first frame has been transmitted, and transmit a first signal over a second data lane while transmitting the control signaling over the first data lane, the first signal indicating that a second frame transmitted over the second data lane includes padding. A first frame transmitted over a first data lane may include data that is part of a transaction executed between two devices coupled to the serial bus.

In certain examples, a second signal may be transmitted over a third data lane while the control signaling is transmitted over the first data lane. The second signal may indicate that a third frame transmitted over the third data lane includes data that is part of the transaction. For example, a first state of the second signal may indicate that the frame transmitted on the third data lane included valid data, while a second state of the second signal may indicate that the frame transmitted on the third data lane included padding. The plurality of frames to be transmitted over the serial bus may be provided by populating the first frame with a single byte or word that is part of the transaction, and populating second frame with a padding byte or word. The plurality of frames to be transmitted over the serial bus may be provided by populating the third frame with another byte or word that is part of the transaction. The plurality of frames to be transmitted over the serial bus may be provided by striping one or more bytes or words of the transaction across the plurality of frames, where the one or more bytes or words may be insufficient to fully populate the plurality of frames.

In various examples, the first signal and the second signal are multi-bit signals. Each bit of the multi-bit signals may be transmitted in accordance with timing defined by pulses in the control signaling. The multi-bit signals may encode control information. The multi-bit signals may indicate a number of bytes or words of the transaction that are striped across the plurality of frames. The multi-bit signals may indicate a number of padding bytes or words that are striped across the plurality of frames.

In another example, the processor-readable storage medium 2518 includes code and/or instructions for managing data transmissions over a serial bus having multiple data lanes. The processor-readable storage medium 2518 may include code and/or instructions for providing a plurality of frames to be transmitted over the serial bus, and transmitting the plurality of frames over a corresponding number of data lanes of the serial bus in accordance with timing defined by a clock signal transmitted on a clock lane of the serial bus. A first frame transmitted over a first data lane includes data that is part of a transaction executed between two devices coupled to the serial bus. The processor-readable storage medium 2518 may include code and/or instructions for transmitting control signaling over the first data lane and the clock lane after the first frame has been transmitted, and transmitting a first signal over a second data lane while transmitting the control signaling over the first data lane, the first signal indicating that a second frame transmitted over the second data lane includes padding.

The processor-readable storage medium 2518 may include code and/or instructions for transmitting a second signal over a third data lane while transmitting the control signaling over the first data lane, the second signal indicating that a third frame transmitted over the third data lane includes data that is part of the transaction. The processor-readable storage medium 2518 may include code and/or instructions for populating the first frame with a single byte or word that is part of the transaction, and populating second frame with a padding byte or word. The processor-readable storage medium 2518 may include code and/or instructions for populating the third frame with another byte or word that is part of the transaction. The processor-readable storage medium 2518 may include code and/or instructions for striping one or more bytes or words of the transaction across the plurality of frames. The one or more bytes or words may be insufficient to fully populate the plurality of frames. The first signal and the second signal may be multi-bit signals.

In some instances, the first signal is a multi-bit signal, each bit of the multi-bit signal being transmitted in accordance with timing defined by pulses in the control signaling. The multi-bit signal may encode control information. The multi-bit signal may indicate a number of bytes or words of the transaction that are striped across the plurality of frames. The multi-bit signal may indicate a number of padding bytes or words that are striped across the plurality of frames.

In another example, the processor-readable storage medium 2518 includes code and/or instructions for managing data transmissions over a serial bus having multiple data lanes. The processor-readable storage medium 2518 may include code and/or instructions for encoding data in a sequence of symbols transmitted over the serial bus, where each bit of each symbol determines signaling state of a data lane and clock information is embedded in transitions between consecutive symbols in the sequence of symbols. The processor-readable storage medium 2518 may include code and/or instructions for transmitting the sequence of symbols over a plurality of lanes of the serial bus, where each lane in the plurality of lanes carries one bit of each symbol. The processor-readable storage medium 2518 may include code and/or instructions for transmitting a control signaling over a first data lane and a clock lane of the serial bus after the sequence of symbols has been transmitted, and transmitting a first signal over a second data lane while transmitting the control signaling over the first data lane. The first signal may be encoded with information identifying a number of valid symbols in the sequence of symbols.

The processor-readable storage medium 2518 may include code and/or instructions for transmitting a second signal over a third data lane while transmitting the control signaling over the first data lane. The first signal and the second signal may identify the number of valid symbols in the sequence of symbols. The processor-readable storage medium 2518 may include code and/or instructions for transmitting a second signal over a third data lane while transmitting the control signaling over the first data lane. The first signal and the second signal may identify the number of symbols in the sequence of symbols that carry invalid or padding data.

The processor-readable storage medium 2518 may include code and/or instructions for transmitting a bit of each symbol over the clock lane of the serial bus. The processor-readable storage medium 2518 may include code and/or instructions for transmitting a plurality of frames over at least one data lane of the serial bus in accordance with timing defined by a clock signal transmitted on the clock lane of the serial bus while the sequence of symbols is being transmitted over the plurality of lanes of the serial bus.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for managing data transmissions over a serial bus, the method comprising:
providing a plurality of frames to be transmitted over the serial bus;
transmitting the plurality of frames using multiple data lanes of the serial bus, and in accordance with timing defined by a clock signal transmitted on a clock lane of the serial bus, wherein a first frame transmitted over a first data lane comprises data that is part of a transaction executed between two devices coupled to the serial bus;
transmitting control signaling over the first data lane and the clock lane after the first frame has been transmitted; and
transmitting a first signal over a second data lane while transmitting the control signaling over the first data lane, the first signal indicating that a second frame transmitted over the second data lane includes padding.

2. The method of claim 1, further comprising:
transmitting a second signal over a third data lane while transmitting the control signaling over the first data lane, the second signal indicating that a third frame transmitted over the third data lane includes data that is part of the transaction, wherein the first signal and the second signal each comprise one or more bits.

3. The method of claim 2, wherein providing the plurality of frames to be transmitted over the serial bus comprises:
populating the first frame with a single byte or word that is part of the transaction; and
populating the second frame with a padding byte or word.

4. The method of claim 3, wherein providing the plurality of frames to be transmitted over the serial bus further comprises:
populating the third frame with another byte or word that is part of the transaction.

5. The method of claim 1, wherein providing the plurality of frames to be transmitted over the serial bus comprises:
striping one or more bytes or words of the transaction across the plurality of frames, wherein the one or more bytes or words are insufficient to fully populate the plurality of frames.

6. The method of claim 1, wherein the control signaling comprises a restart pattern or exit pattern when the serial bus is operated in accordance with an I3C high data rate protocol.

7. The method of claim 1, wherein the first signal carries a plurality of bits, each bit of the first signal being transmitted in accordance with timing defined by pulses in the control signaling.

8. The method of claim 1, wherein the first signal carries control information encoded in at least one bit, each bit of the control information being transmitted in accordance with timing defined by pulses in the control signaling.

9. The method of claim 8, wherein the control information indicates a number of bytes or words of the transaction that are striped across the plurality of frames.

10. The method of claim 8, wherein the control information indicates a number of padding bytes or words that are striped across the plurality of frames.

11. An apparatus, comprising:
a bus interface configured to couple the apparatus to a serial bus that provides multiple data lanes; and
a controller configured to:
provide a plurality of frames to be transmitted over the serial bus;
transmit the plurality of frames using the multiple data lanes of the serial bus, and in accordance with timing defined by a clock signal transmitted on a clock lane of the serial bus, wherein a first frame transmitted over a first data lane comprises data that is part of a transaction executed between two devices coupled to the serial bus;
transmit control signaling over the first data lane and the clock lane after the first frame has been transmitted; and
transmit a first signal over a second data lane while transmitting the control signaling over the first data lane, the first signal indicating that a second frame transmitted over the second data lane includes padding.

12. The apparatus of claim 11, wherein the controller is further configured to:
transmit a second signal over a third data lane while transmitting the control signaling over the first data lane, the second signal indicating that a third frame transmitted over the third data lane includes data that is part of the transaction, wherein the first signal and the second signal each comprise one or more bits.

13. The apparatus of claim 12, wherein the controller is further configured to:

populate the first frame with a single byte or word that is part of the transaction; and populate the second frame with a padding byte or word.

14. The apparatus of claim 13, wherein the controller is further configured to:

populate the third frame with another byte or word that is part of the transaction.

15. The apparatus of claim 11, wherein the controller is further configured to:

stripe one or more bytes or words of the transaction across the plurality of frames, wherein the one or more bytes or words are insufficient to fully populate the plurality of frames.

16. The apparatus of claim 11, wherein the control signaling comprises a restart pattern or exit pattern when the serial bus is operated in accordance with an I3C high data rate protocol.

17. The apparatus of claim 11, wherein the first signal carries a plurality of bits, each bit of the first signal being transmitted in accordance with timing defined by pulses in the control signaling.

18. The apparatus of claim 11, wherein the first signal carries control information encoded in at least one bit, each bit of the control information being transmitted in accordance with timing defined by pulses in the control signaling.

19. The apparatus of claim 18, wherein the control information indicates a number of bytes or words of the transaction that are striped across the plurality of frames.

20. The apparatus of claim 18, wherein the control information indicates a number of padding bytes or words that are striped across the plurality of frames.

21. A method for managing data transmissions over a serial bus having multiple data lanes, the method comprising:

encoding data in a sequence of symbols transmitted over the serial bus, wherein clock information is embedded in transitions between consecutive symbols in the sequence of symbols;

transmitting the sequence of symbols over a plurality of lanes of the serial bus, wherein each lane in the plurality of lanes carries one bit of each symbol;

transmitting control signaling over a first data lane and a clock lane of the serial bus after the sequence of symbols has been transmitted; and transmitting a first signal over a second data lane while transmitting the control signaling over the first data lane, wherein the first signal is encoded with information identifying a number of valid symbols in the sequence of symbols.

22. The method of claim 21, further comprising:

transmitting a second signal over a third data lane while transmitting the control signaling over the first data lane, wherein the first signal and the second signal identify the number of valid symbols in the sequence of symbols.

23. The method of claim 21, further comprising:

transmitting a second signal over a third data lane while transmitting the control signaling over the first data lane, wherein the first signal and the second signal identify the number of valid symbols in the sequence of symbols that carry invalid or padding data.

24. The method of claim 21, wherein the control signaling comprises a restart pattern or exit pattern when the serial bus is operated in accordance with an I3C high data rate protocol.

25. The method of claim 21, further comprising transmitting a plurality of frames over at least one data lane of the serial bus in accordance with timing defined by a clock signal transmitted on the clock lane of the serial bus while the sequence of symbols is being transmitted over the plurality of lanes of the serial bus.

26. An apparatus comprising:

a bus interface configured to couple the apparatus to a serial bus that provides multiple data lanes; and a controller configured to:

encode data in a sequence of symbols transmitted over the serial bus, wherein clock information is embedded in transitions between consecutive symbols in the sequence of symbols;

transmit the sequence of symbols over a plurality of lanes of the serial bus, wherein each lane in the plurality of lanes carries one bit of each symbol;

transmit control signaling over a first data lane and a clock lane of the serial bus after the sequence of symbols has been transmitted; and transmit a first signal over a second data lane while transmitting the control signaling over the first data lane, wherein the first signal is encoded with information identifying a number of valid symbols in the sequence of symbols.

27. The apparatus of claim 26, wherein the controller is further configured to:

transmit a second signal over a third data lane while transmitting the control signaling over the first data lane, wherein the first signal and the second signal identify the number of valid symbols in the sequence of symbols.

28. The apparatus of claim 26, wherein the controller is further configured to:

transmit a second signal over a third data lane while transmitting the control signaling over the first data lane, wherein the first signal and the second signal identify the number of valid symbols in the sequence of symbols that carry invalid or padding data.

29. The apparatus of claim 26, wherein the control signaling comprises a restart pattern or exit pattern when the serial bus is operated in accordance with an I3C high data rate protocol.

30. The apparatus of claim 26, wherein the controller is further configured to:

transmit a plurality of frames over at least one data lane of the serial bus in accordance with timing defined by a clock signal transmitted on the clock lane of the serial bus while the sequence of symbols is being transmitted over the plurality of lanes of the serial bus.

* * * * *